US008535144B2

(12) United States Patent
Amour

(10) Patent No.: US 8,535,144 B2
(45) Date of Patent: Sep. 17, 2013

(54) SYSTEMS AND METHODS FOR FIXED-ODDS BASED GAMING ACTIVITIES

(75) Inventor: Marc Amour, Ultimo (AU)

(73) Assignee: G5 Enterprizes Pty Ltd. (AU)

( * ) Notice: Subject to any disclaimer, the term of this patent is extended or adjusted under 35 U.S.C. 154(b) by 1440 days.

(21) Appl. No.: 11/757,552

(22) Filed: Jun. 4, 2007

(65) Prior Publication Data

US 2007/0287533 A1 Dec. 13, 2007

(30) Foreign Application Priority Data

| Jun. 2, 2006 | (AU) | 2006903031 |
| Oct. 13, 2006 | (AU) | 2006100876 |
| Oct. 13, 2006 | (AU) | 2006100877 |
| Oct. 13, 2006 | (AU) | 2006100878 |
| Nov. 24, 2006 | (AU) | 2006906599 |
| Nov. 24, 2006 | (AU) | 2006906600 |
| Feb. 23, 2007 | (AU) | 2007100144 |
| Feb. 23, 2007 | (AU) | 2007900946 |
| May 22, 2007 | (AU) | 2007100414 |
| May 22, 2007 | (AU) | 2007902728 |

(51) Int. Cl.
*A63F 3/06* (2006.01)
*A63F 3/08* (2006.01)

(52) U.S. Cl.
USPC ............... 463/25; 463/17; 463/18; 463/28; 463/29; 705/14.14; 705/14.34; 705/35; 705/37

(58) Field of Classification Search
USPC ............ 463/17, 18, 25, 28, 29; 705/14, 705/35, 37
See application file for complete search history.

(56) References Cited

U.S. PATENT DOCUMENTS

| 4,494,197 A | 1/1985 | Troy et al. |
| 4,689,742 A | 8/1987 | Troy et al. |
| 4,875,686 A | 10/1989 | Timms |
| 4,926,327 A | 5/1990 | Sidley |

(Continued)

FOREIGN PATENT DOCUMENTS

| AU | 200176106 A1 | 4/2002 |
| EP | 1278167 A2 | 1/2003 |

(Continued)

OTHER PUBLICATIONS

International Search Report (ISR) for PCT/AU2007/000774.

(Continued)

*Primary Examiner* — Milap Shah
*Assistant Examiner* — Lawrence Galka
(74) *Attorney, Agent, or Firm* — Katten Muchin Rosenman LLP

(57) ABSTRACT

Described herein are various systems and methods for providing gaming activities. These particularly relate to "fixed-odds" type gaming activities whereby a player places a bet in relation to an event outcome on the basis of a payout ratio and, in the case that the event outcome is identified as a winning outcome, the player is awarded a prize based on the entry fee and the payout ratio. In overview, the present embodiments focus on situations wherein the player is additionally eligible to receive a secondary prize that is indeterminate at the point in time the bet is placed. The nature and purpose of this secondary prize varies between embodiments. For example, in some embodiments the secondary prize effectively provides a winning player with a more advantageous payout ratio, in some embodiments the secondary prize allows the player to participate in a secondary game.

12 Claims, 15 Drawing Sheets

(56) References Cited

U.S. PATENT DOCUMENTS

| | | | |
|---|---|---|---|
| 5,083,782 A | 1/1992 | Nilssen | |
| 5,707,286 A * | 1/1998 | Carlson | 463/16 |
| 5,709,603 A | 1/1998 | Kaye | |
| 6,077,163 A | 6/2000 | Walker et al. | |
| 6,104,815 A | 8/2000 | Alcorn et al. | |
| 6,107,932 A | 8/2000 | Walker et al. | |
| 6,113,493 A | 9/2000 | Walker et al. | |
| 6,254,482 B1 | 7/2001 | Walker et al. | |
| 6,267,669 B1 | 7/2001 | Luciano, Jr. et al. | |
| 6,443,843 B1 | 9/2002 | Walker et al. | |
| 6,626,758 B1 | 9/2003 | Parham et al. | |
| 6,650,952 B1 | 11/2003 | Garcia et al. | |
| 6,773,350 B2 | 8/2004 | Yoshimi et al. | |
| 6,869,362 B2 | 3/2005 | Walker et al. | |
| 7,028,907 B2 | 4/2006 | Collins et al. | |
| 7,052,394 B2 | 5/2006 | Walker et al. | |
| 7,086,947 B2 | 8/2006 | Walker et al. | |
| 7,140,964 B2 | 11/2006 | Walker et al. | |
| RE39,644 E | 5/2007 | Alcorn et al. | |
| 7,210,998 B2 | 5/2007 | Kazaoka et | |
| 7,300,349 B2 * | 11/2007 | Walker et al. | 463/17 |
| 7,322,885 B1 * | 1/2008 | Luciano et al. | 463/17 |
| 7,736,226 B1 * | 6/2010 | Luciano, Jr. | 463/25 |
| 2001/0012797 A1 | 8/2001 | Walker et al. | |
| 2001/0036864 A1 | 11/2001 | Melas | |
| 2001/0051540 A1 | 12/2001 | Hindman et al. | |
| 2002/0037767 A1 | 3/2002 | Ebin | |
| 2002/0065566 A1 | 5/2002 | Aronson et al. | |
| 2002/0087447 A1 | 7/2002 | McDonald et al. | |
| 2002/0147040 A1 | 10/2002 | Walker et al. | |
| 2002/0198052 A1 | 12/2002 | Soltys et al. | |
| 2003/0003988 A1 | 1/2003 | Walker et al. | |
| 2003/0032476 A1 | 2/2003 | Walker et al. | |
| 2003/0036427 A1 * | 2/2003 | Brandstetter et al. | 463/29 |
| 2003/0047869 A1 * | 3/2003 | Walker et al. | 273/139 |
| 2003/0054888 A1 | 3/2003 | Walker et al. | |
| 2003/0055727 A1 | 3/2003 | Walker et al. | |
| 2003/0087683 A1 | 5/2003 | Gatto et al. | |
| 2003/0104857 A1 | 6/2003 | Jenkins | |
| 2003/0119585 A1 | 6/2003 | Walker et al. | |
| 2003/0125108 A1 | 7/2003 | Groz | |
| 2003/0157976 A1 | 8/2003 | Simon et al. | |
| 2003/0220138 A1 | 11/2003 | Walker et al. | |
| 2004/0147308 A1 | 7/2004 | Walker et al. | |
| 2004/0210507 A1 | 10/2004 | Asher et al. | |
| 2004/0235542 A1 | 11/2004 | Stronach et al. | |
| 2004/0248637 A1 | 12/2004 | Liebenberg et al. | |
| 2005/0003893 A1 | 1/2005 | Hogwood et al. | |
| 2005/0020347 A1 * | 1/2005 | Moshal | 463/17 |
| 2005/0059495 A1 | 3/2005 | Horowitz et al. | |
| 2005/0086143 A1 * | 4/2005 | Vlazny et al. | 705/35 |
| 2005/0101376 A1 | 5/2005 | Walker et al. | |
| 2005/0131789 A1 | 6/2005 | Mintz | |
| 2005/0164793 A1 | 7/2005 | Merimovich et al. | |
| 2005/0171878 A1 * | 8/2005 | Pennock | 705/35 |
| 2005/0179206 A1 | 8/2005 | Cogert | |
| 2005/0181876 A1 | 8/2005 | Vlazny et al. | |
| 2005/0202873 A1 | 9/2005 | Asher et al. | |
| 2005/0202874 A1 | 9/2005 | Asher et al. | |
| 2005/0227756 A1 | 10/2005 | Kane et al. | |
| 2006/0035712 A1 | 2/2006 | Eastman et al. | |
| 2006/0046840 A1 | 3/2006 | Walker et al. | |
| 2006/0105839 A1 | 5/2006 | Graeve et al. | |
| 2006/0155628 A1 | 7/2006 | Horowitz | |
| 2006/0160620 A1 | 7/2006 | Matthews et al. | |
| 2006/0211493 A1 | 9/2006 | Walker et al. | |
| 2006/0217191 A1 | 9/2006 | Walker et al. | |
| 2006/0217192 A1 | 9/2006 | Walker et al. | |
| 2006/0229126 A1 | 10/2006 | Walker et al. | |
| 2006/0258422 A1 | 11/2006 | Walker et al. | |
| 2006/0287094 A1 | 12/2006 | Mahaffey et al. | |
| 2007/0004511 A1 | 1/2007 | Walker et al. | |
| 2007/0015564 A1 | 1/2007 | Walker et al. | |
| 2007/0087804 A1 | 4/2007 | Knowles et al. | |
| 2007/0135210 A1 | 6/2007 | Walker et al. | |
| 2007/0156464 A1 | 7/2007 | Walker et al. | |
| 2007/0156465 A1 | 7/2007 | Walker et al. | |
| 2007/0156466 A1 | 7/2007 | Walker et al. | |
| 2007/0167219 A1 * | 7/2007 | Groz | 463/25 |
| 2007/0203971 A1 | 8/2007 | Walker et al. | |
| 2007/0276705 A1 | 11/2007 | Walker et al. | |

FOREIGN PATENT DOCUMENTS

| | | |
|---|---|---|
| JP | 2005050281 | 2/2005 |
| KR | 20020026339 | 4/2002 |
| WO | 9736658 A1 | 10/1997 |
| WO | 0035545 A1 | 6/2000 |
| WO | 0247010 A1 | 6/2002 |
| WO | 2005086778 | 9/2005 |
| WO | 2006017660 A2 | 2/2006 |
| WO | 2006020692 A2 | 2/2006 |

OTHER PUBLICATIONS

Ridge, "Innovations in savings schemes: The bonus bonds trust in New Zealand," Financial Services Review (1998).

National Savings and Investments, Premium Bonds—How they Work, http://www.nsandi.com.

Prize Bonds, Frequently Asked Questions, http://www.prizebonds.ie.

Bonus Bonds, Frequently Asked Questions, http://www.bonusbonds.co.nz.

National Bonds, Frequently Asked Questions, http://www.nationalbonds.ae/howitworks.htm.

Ridge, Jenny; "Innovations in savings schemes: the bonus bonds trust in New Zealand"; JAI Press Inc. 1998, ProQuest Information and Learning Company, Internet http://findarticles.com/p/articles//mi_qa3743/is_199801/ai_n8796817/print>.

* cited by examiner

SYSTEMS AND METHODS FOR FIXED-ODDS BASED GAMING ACTIVITIES

FIELD OF THE INVENTION

The present invention relates to systems and methods for providing gaming activities. Some embodiments provide hardware and software components for the implementation of such systems and methods. The term "gaming" is intended to be interpreted in the broadest sense, as encompassing the fields of gambling, gaming, wagering, betting, lotteries and games or competitions of skill and/or knowledge and/or chance.

BACKGROUND TO THE INVENTION

The following discussion of the prior art is intended to place the invention in an appropriate context and to allow the unique characteristics and advantages of it to be more fully understood. However, any discussion of the prior art throughout the specification should in no way be considered as an express or implied admission that such prior art is widely known or forms part of common general knowledge in the field.

One broad category of gaming activity is "fixed-odds" based, often referred to as wagering, which is typical of most types of sports betting and bookmaking operations. In this form, players bet on event outcomes, and a gaming operator defines a payout ratio (commonly referred to as "odds") for each event outcome. This payout ratio expresses the amount by which the stake of a player differs from that of the gaming operator. In the case that a player bets on an event outcome that is subsequently identified as a winning outcome, the player receives a prize based on the quantum of bet placed and the payout ratio. It will be appreciated that, in such gaming activities, the definition of payout ratios by the gaming operator is, to some extent, an exercise in risk management. In particular, the operator does not know, at the time of defining payout ratios, which event outcome or outcomes will be identified as winning outcomes. As such, a careful balance must be reached—the general objective is to offer payout ratios that are sufficiently speculative to entice player participation in relation to a range of mutually exclusive event outcomes, yet sufficiently conservative over the full range of event outcomes so as to maintain operator risks and profit margins within acceptable thresholds over time. In some cases, where the payout ratios sway towards the former end of the spectrum, the gaming operator runs at a loss in relation to a given event.

The fixed-odds format of gaming has remained generally unchanged for a long period of time, due in part to various rigidities stemming from the risk management concern associated with managing a fixed-odds prize pool. Commercially, there is an inherent desire to entice greater participation, however this is difficult to achieve without an operator taking on a greater amount of risk. From the players' perspective, there is an inherent desire for a more diverse range of gaming activities and the potential for improved payout ratios. Accordingly, there is a need in the art for improved and/or different systems and methods for fixed-odds based gaming activities.

SUMMARY OF THE INVENTION

It is an object of the present invention to overcome or ameliorate one or more of the disadvantages of the prior art, or at least to provide a useful alternative.

One aspect of the invention provides a method for providing a gaming activity wherein a plurality of players provide respective entry fees, the method including the steps of:

defining, for one or more event outcomes, respective payout ratios;

receiving, for each player, entry data indicative of an entry fee and an event outcome;

adding, for each player, at least a portion of the received entry data to a repository of collective entry data;

allocating to each player, on the basis of the entry fee provided by that player and the event outcome selected by that player, one or more primary entries in relation to a primary gaming activity whereby, in the case that for a given player the selected event outcome is identified as a winning outcome, that player is awarded a primary prize based on the entry fee and the payout ratio defined for the selected event outcome; and allocating to at least one player a supplementary prize, wherein one or more characteristics of the supplementary prize are determined by reference to one or more characteristics of at least a portion of the collective entry data received at a point in time following the allocation of one or more primary entries to that player.

One embodiment provides a method wherein at least one player is allocated a supplementary prize in addition to the primary prize if, for that player, the selected event outcome is identified as the winning outcome.

One embodiment provides a method wherein all players, for whom the selected event outcome is identified as the winning outcome, are allocated a supplementary prize in addition to the primary prize.

One embodiment provides a method wherein at least one player is allocated the supplementary prize irrespective of whether, for that player, the selected event outcome is identified as the winning outcome.

One embodiment provides a method wherein each player is allocated a supplementary prize irrespective of the winning outcome.

One embodiment provides a method wherein the supplementary prize includes one or more supplementary entries in a supplementary activity.

One embodiment provides a method wherein the supplementary activity is a supplementary gaming activity.

One embodiment provides a method wherein the supplementary gaming activity is a pari-mutuel gaming activity.

One embodiment provides a method wherein the supplementary prize also includes a prize awarded in relation to the supplementary activity.

One embodiment provides a method wherein each supplementary prize includes an entry in a draw-based game.

One embodiment provides a method wherein the entry in a draw-based game includes a sweepstakes ticket.

One embodiment provides a method wherein the entry in a draw-based game includes a raffle ticket.

One embodiment provides a method wherein the entry data for a given player is indicative of timing information.

One embodiment provides a method wherein the timing information is indicative of a date and/or time when the entry data was received.

One embodiment provides a method wherein the timing information is indicative of a date and/or time when the entry fee was received.

One embodiment provides a method wherein the one or more characteristics of the supplementary prize include a value component.

One embodiment provides a method wherein the value component is, at least notionally, financial in nature.

One embodiment provides a method wherein the value component is determined as a function of the time elapsed since the entry data was received and a specified time at which the supplementary prize is to be determined.

One embodiment provides a method wherein the value component of the supplementary prize is determined at a first point in time defined relative to a second point in time at which the winning outcome is identified.

One embodiment provides a method wherein the first point in time is after the second point in time.

One embodiment provides a method wherein the value component of each supplementary prize is related to the player's entry fee.

One embodiment provides a method wherein the value component of each supplementary prize is related to the sum of all received entry fees.

One embodiment provides a method wherein each supplementary prize has the same value component.

One embodiment provides a method wherein the supplementary prize includes at least a portion of a supplementary entry fee that is exchangeable for one or more supplementary entries in the supplementary gaming activity.

One embodiment provides a method wherein the supplementary prize includes a secondary prize that is awarded in relation to a supplementary gaming activity.

One embodiment provides a method wherein one or more characteristics of the supplementary gaming activity are determined at a point in time following the allocation of the primary entries by reference to one or more characteristics of the entry data received at that point in time.

One embodiment provides a method wherein one or more characteristics of the supplementary gaming activity are determined at a point in time following the allocation of the primary entries by reference to one or more characteristics of the collective entry data received at that point in time.

One embodiment provides a method wherein the one or more characteristics of the supplementary gaming activity are selected from the list including:
the value of the secondary prize;
the time at which a winner of the secondary prize is identified;
the eligibility of a given player to win the secondary prize; and
the relative probability of a given player winning the secondary prize.

One embodiment provides a method wherein the one or more characteristics of the collective entry data are selected from the list including:
a value of entry fees received;
a number of entries allocated;
a value of entry fees received in a specified timeframe;
a value of entry fees corresponding to a specified one or more event outcomes;
a number of entries allocated in a specified timeframe;
a number of entries allocated on the basis of a specified one or more event outcomes; and
a supplementary contribution amount.

One embodiment provides a method including the step of:
identifying, for each entry fee, a total contribution amount corresponding to that entry fee, the total contribution amount including:
i. a primary contribution amount comprising the entry fee, less any predefined deductions; and
ii. a supplementary contribution amount;
wherein at least a proportion of the supplementary contribution amount is used to fund at least a proportion of one or more supplementary prizes.

One embodiment provides a method wherein, for a given entry fee, the supplementary contribution amount corresponds to an amount derived from one or more sources selected from a group comprising:
an investment return derived by subjecting at least a proportion of that entry fee to an investment procedure for a period of time;
an operator contribution; and
a third-party contribution.

One embodiment provides a method wherein all of the supplementary contribution is used to, at least notionally, fund one or more supplementary prizes.

One embodiment provides a method wherein a given player, in exchange for a given entry fee, is provided a primary entry and an auxiliary entry having a different event outcome, whereby in the case that the selected event outcome of the primary entry is not identified as a winning outcome, the auxiliary entry is eligible for identification as a winning entry.

One embodiment provides a method wherein the different outcome of the auxiliary entry is defined such that the auxiliary entry will be a winning entry if the selected event outcome of the primary entry is not identified as the winning outcome.

One embodiment provides a method wherein a proportion of the entry fee attributable to the auxiliary entry is refundable to the player after the winning outcome has been determined irrespective of the winning outcome, such that this refundable proportion of the entry fee at least partially offsets the extent to which the entry fee is placed at risk.

One embodiment provides a method wherein the proportion of the entry fee attributable to the auxiliary entry that is refundable is predetermined.

One embodiment provides a method wherein a primary entry is allocated to a given player in exchange for a proportion of the entry fee that is placed at risk and an auxiliary entry is allocated to the player in exchange for a complementary proportion of the entry fee that is refundable on the basis of predetermined refund criteria, wherein in the case that the selected event outcome of the primary entry is not identified as a winning outcome, the auxiliary entry is identified as a winning entry.

One embodiment provides a method wherein:
in the case that the auxiliary entry is identified as a winning entry, the player is awarded an auxiliary prize;
in the case that the auxiliary entry is not identified as a winning entry, the player is awarded a refund of the complementary proportion of the entry fee.

One embodiment provides a method wherein the auxiliary prize at least notionally includes the complementary proportion of the entry fee.

One embodiment provides a method wherein the auxiliary prize at least notionally includes a net investment return derived by subjecting at least part of the entry fee to an investment procedure.

One embodiment provides a method wherein the auxiliary prize is distributed from an auxiliary prize pool that is funded by a net investment return derived by subjecting the total entry fees of all players to an investment procedure.

One embodiment provides a method wherein the payout ratio is fixed at the time at which each entry is received.

One embodiment provides a method wherein the supplementary prize is allocated at the time of receiving the associated entry data.

One embodiment provides a method wherein the supplementary prize is allocated at the time of redeeming the primary prize.

One embodiment provides a method wherein the supplementary prize is allocated at a predetermined time.

One embodiment provides a method wherein the predetermined time is after a time at which one or more winning primary entries are identified.

Another aspect of the invention provides a system for providing a gaming activity, the system including a processor configured for performing a method according to any embodiment described above.

A computer-readable carrier medium carrying a set of instructions that when executed by one or more processors cause the one or more processors to carry out a method according to any embodiment described above.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms "comprising", "comprised of", or "which comprises" is an open term that means including at least the elements/features that follow, but not excluding others. Thus, the term "comprising", when used in the claims, should not be interpreted as being limitative to the means or elements or steps listed thereafter. For example, the scope of the expression a device comprising A and B should not be limited to devices consisting only of elements A and B. Any one of the terms "including", "which includes" or "that includes" as used herein is also an open term that also means including at least the elements/features that follow the term, but not excluding others. Thus, "including" is synonymous with and means the same as "comprising", Similarly, the term "coupled", when used herein, should not be interpreted as being limitative to direct connections only. The terms "coupled" and "connected," along with their derivatives, may be used. The scope of the expression a "device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

The term "complementary" is primarily used herein with reference to relative percentages of two mutually exclusive components or proportions, primarily the proportion of an entry fee that is placed at risk, and the "complementary" proportion that is refundable (or vice versa). In this context, if a given proportion is X %, then the complementary proportion would be 100%-X %. It should also be noted that as used herein, unless the context clearly dictates otherwise, any reference to "a proportion" is intended to encompass the situations where that proportion is 0% or 100%, as well as any intermediate percentage.

Any references herein to "investment return" or "investment income" are to be interpreted as references to "net investment return" and "net investment income" unless specifically stated otherwise. In practice, the investment procedure results in the derivation of a gross investment return, and various deductions (such as taxes, levies, duties, commissions, investment charges, broker fees, operator charges, and so on) are taken from this gross investment return. The term "net investment return" defines a remainder of the gross investment return, this net investment return being added to the prize pool as some or all of the supplementary income.

The terms "invest", "investing", "investment" and the like as used herein are intended to be afforded a broad interpretation covering the utilisation or disposition of funds or valuable assets in a general sense. Examples include but are not limited to, investment in any financial or real asset or property of any type, whether securitised or otherwise, with value denominated in any currency or combination of currencies, whether listed on a public trading exchange or unlisted on any such exchange, including the following, as well as warrants, options, derivatives, deferred purchase contracts, installment receipts and the like over any of the following:

Deposits with third parties whether interest-bearing or otherwise and whether held with a financial institution or some other party.

Mortgages, debt instruments or securities of any type.

Any form of American Depository Receipts or similar instruments or asset classes as may be available from time to time in any jurisdiction.

Promissory notes, bills of exchange, convertible notes, loan notes or any other form of debt or debt instrument.

Convertible or other bonds.

Preference shares, redeemable preference shares, stocks, equities or shares of any class whether fully or partly paid up.

Warrants, options, derivatives, deferred purchase contracts, installment receipts and the like.

Options, warrants or similar instruments convertible into stocks, shares or equities of any sort.

Warrants, options, derivatives, deferred purchase contracts, installment receipts or the like over any index relating to any matter including but not limited to stocks, shares or equities of any sort or futures or any financial instrument or financial asset.

Currency or interest rate swap agreements, forward interest rate agreements and the like.

Real property or property of any other kind including intellectual property.

Any contract, arrangement or instrument of any type which confers a benefit of value in relation to an item or items of value.

Futures contracts and the like in relation to any thing, item or matter.

Currencies.

Precious metals.

Works of art and any other valuables such as stamps, coins or jewels; and

Any other form of investment offering at least the potential for return on capital over a period of time, whether or not the capital is guaranteed, and whether or not a return on capital is guaranteed.

Offshore investment.

Trade in bullion or the like.

Alternatives forms of the disposition of valuable assets, for example buy-back contracts and other instruments used in certain jurisdictions in light of Sharia Law, or in accord with other religious laws, or other customs or beliefs.

Additionally, the terms "invest", "investing", "investment" and the like, as used herein, should be construed as including, but not limited to, the use of one or more money management techniques to increase an available amount of funds and investing the resultant increased available amount of funds.

It should also be appreciated that the "investment return" need not be cash-based or even financial in nature, provided merely that it has some intrinsic or perceived value in the broad context of the gaming activity.

Further, it should be appreciated that for the purposes of the present invention, any investment procedure (or other methodology for generating supplementary contributions for or on behalf of players) may be entirely invisible from the players' perspectives, being managed as a "back office" operation by or on behalf of the gaming operator. Indeed, in many embodiments, this is the preferred approach, so as to shield the players from the detail of potentially complex investment and risk management strategies, which might otherwise detract from the experience and enjoyment of the primary gaming activity itself. This is an important distinction with respect to some activities, in which a transparent understanding of the underlying investment mechanics is primary, and any associated gaming activity is of secondary significance.

BRIEF DESCRIPTION OF THE DRAWINGS

Preferred embodiments of the invention will now be described, by way of example only, with reference to the accompanying drawings in which.

DETAILED DESCRIPTION

Described herein are various systems and methods for providing gaming activities. These particularly relate to "fixed-odds" type gaming activities whereby a player places a bet in relation to an event outcome on the basis of a payout ratio and, in the case that the event outcome is identified as a winning outcome, the player is awarded a prize based on the entry fee and the payout ratio. In overview, the present embodiments focus on situations wherein the player is additionally selectively allocated a supplementary prize that is at least to some extent indeterminate at the point in time the bet is placed. The nature of this supplementary prize varies between embodiments. For example, in some embodiments the supplementary prize provides one or more winning players more advantageous payout ratios in relation to their respective bets, and in some embodiments the supplementary prize assists one or more players to potentially mitigate their losses in the case that their respective selected event outcomes are not winning outcomes. These and other examples are considered below.

Figure 1:
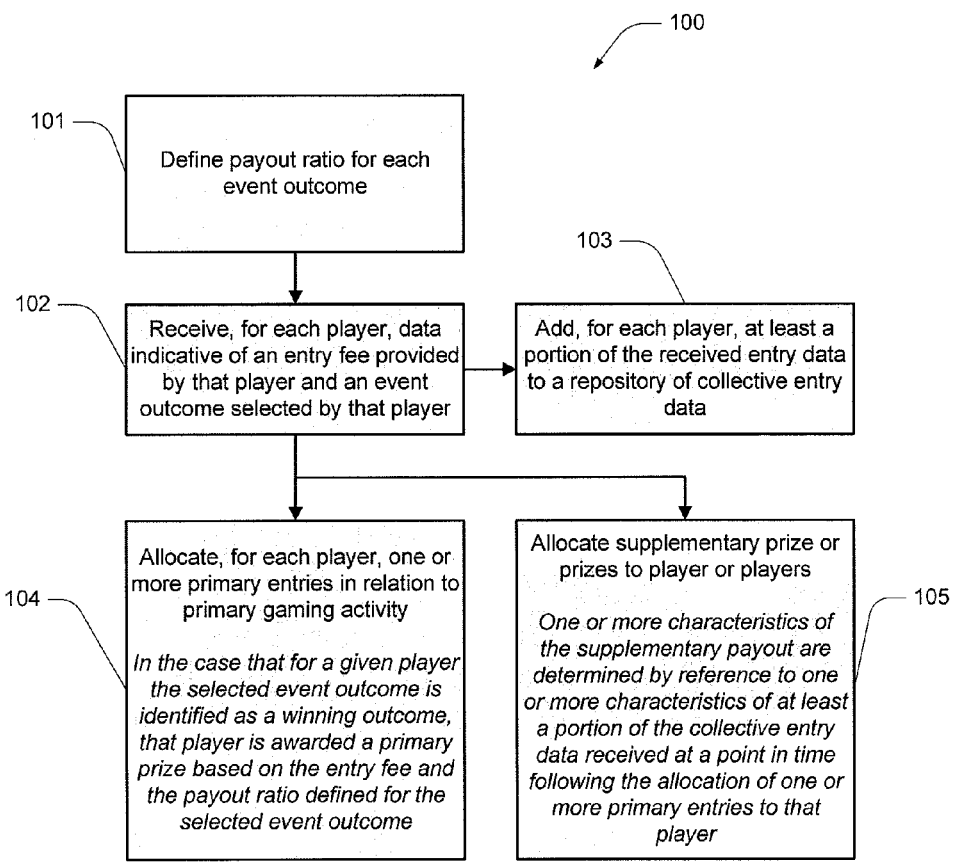
FIG. 1 illustrates a method for providing a gaming activity according to one embodiment.

FIG. 1 illustrates a method 100 according to one embodiment. Step 101 includes defining, for one or more event outcomes, respective payout ratios. An "event outcome" describes a state of affairs that may or may not eventuate. For example, in the context of a sporting event where a first team, Team A, competes with a second team, Team B, one hypothetical event outcome describes the state of affairs where Team A is victorious over Team B in the sporting event. If that state of affairs is physically realized (i.e. Team A is actually victorious over Team B in the sporting event), that event outcome is identified as a winning event outcome.

In the context of the above example, the sporting event involving Team A and Team B is described as an "event", A plurality of event outcomes is commonly defined for a given event. In some embodiments, event outcomes are defined only for a single event. However, for most large-scale gaming activities, event outcomes are defined for a plurality of events that might not (or equally might) share similar characteristics. The following list, which is indented to be indicative only and is by no means exclusive, provides a range of events:

Sporting fixtures, such as team sports, individual sports, motor racing, horse racing, and so on.

Sporting competitions comprising a plurality of individual sporting fixtures.

Non-sporting events, such as elections, celebrity births/deaths/marriages, weather conditions, and so on.

Prices of shares, other securities, and/or commodities, financial market indices, real world indices, financial contracts, and the like.

Generally speaking, the present disclosure is particularly concerned with physically manifested events, as opposed to virtual events that take place solely in the context of a computer system, such as a computer system that implements a random, partially random or pseudo-algorithm to determine event outcomes for virtual events.

In some cases an event outcome relates to a plurality of different events. For example, an event outcome might describe a state of affairs that hinges on a particular result of two or more events. It will be appreciated that there is a substantially unlimited range of possible events and event outcomes for those events.

A payout ratio is defined for each event outcome. A "payout ratio" is indicative of the return on an entry fee awarded to a player in the case that the event outcome selected by that player is identified as a winning outcome. Using the above example of Team A and Team B, assume a payout ratio of 5:1 is defined for an event outcome whereby Team A is victorious. A player who provides an entry fee in relation to that event outcome receives, in the case that Team A is indeed victorious, a prize that is a fivefold multiple of the entry fee provided, plus a refund of the entry fee provided. For example, if a player places a $1 bet on an event outcome having a fractionally represented payout ratio of 5:1, the player receives a prize of $5, plus a refund of his/her $1 bet, making the total return $6. In some cases, the fractional representation is replaced by a decimal representation. In one such decimal representation, "5:1" translates to "$6", indicating that a player receives a total return of $6 for each $1 bet.

Step 102 includes receiving, for each player, entry data indicative of an entry fee and an event outcome. Unless the context clearly requires otherwise, it should be inferred for all examples considered herein that a payout ratio for a given player is defined at or before the time at which the entry data is received for that player.

In the present context, the term "entry fee" describes a sum of consideration that constitutes a wholly or partially refundable payment. No specific implications or connotations should be drawn from the use of the word "fee", which is descriptive only. In some embodiments the entry fee is provided in whole or in part as monetary currency. In other embodiments the entry fee is notionally derived—such as where a consumer purchases predefined goods and/or services unrelated to an entry, and an entry fee is notionally determined as a function of the purchase value, or where the player participates in marketing activities (by viewing advertisements or responding to a survey, for instance), and an entry fee is notionally defined on the basis of a benefit of the gaming operator or a third party receives by virtue of the player's participation in those marketing activities. That is, by purchasing a certain product, a consumer is deemed to have provided an entry fee, and is correspondingly allocated one or more entries. In the presently considered embodiments, the entry fee is wholly provided for the purpose of participation in a gaming activity.

In some embodiments, the "entry fee" defines only a portion of the sum of consideration provided by a player in exchange for one or more entries. For example, in some embodiments a player provides an entry amount, including an entry fee and an additional component, this additional component being, in some cases, attributable to an operator service charge. In some embodiments, although an entry fee is fully refundable, it is only the entry fee component of an entry amount that is fully refundable, with the additional component being non-refundable. It should also be appreciated that the "entry fee" need not be monetary in nature at all, but could constitute any tradable commodity having a real, virtual, deemed or perceived value.

References to "refunds", "refundable" entry fees, and the like should be understood, unless the context dictates otherwise, to encompass full and partial refunds, as well as gross and net refunds. In some instances, for example, a nominal refund may be subject to taxes, duties, levies or other charges, such that the net refund actually received by a player is less than the nominal or gross refund, irrespective of whether that refund is notionally full or partial. Such variations should not be considered to depart from the substance or scope of the present invention.

Step 103 includes adding, for each player, at least a portion of the received entry data to a repository of collective entry data. For example, a respective record in a repository is defined for the entry data received from each player. This repository, in some embodiments, is defined by a central database of a distributed gaming system.

Step 104 includes allocating to each player, on the basis of the entry fee provided by that player and the event outcome selected by that player, one or more primary entries in relation to a primary gaming activity. This primary gaming activity is a fixed-odds type gaming activity whereby, in the case that for a given player the selected event outcome is identified as a winning outcome, that player is awarded a primary prize based on the entry fee and the payout ratio defined for the selected event outcome.

In the examples considered herein, it is assumed that a single entry in the primary gaming activity is provided to a given player in exchange for an entry fee received in relation to a given event outcome. This is consistent with many traditional fixed-odds gaming activities. However, it is recognised that in some cases multiple entries are allocated, typically due to a marketing or administration decision.

In the context of the present disclosure, it is assumed that a gaming activity is an activity where multiple players provide respective entry fees. In exchange for the entry fees, the players are respectively allocated one or more entries. The term "player" as used herein refers to a provider of an entry fee. The term should be construed broadly to include both human players, non-human players, constructs or syndicates defined by a group of two or more human and/or non human players (such as a collaboration between human players), and other legal entities (such as corporations or trusts). In some cases, the player is identified in a computing system by a unique identifier, which might include a purpose-defined identifier, identifier based on personal information, email address, cellular telephone number, or the like.

In the context of the present disclosure, there is discussion of players being "allocated" entries and disclosure of players being "provided" entries. The terms "allocated" and "provided" are regarded as synonymous in this regard. Furthermore, neither of these terms should imply a requirement that a player actually physically receives any entries (although, equally, they may do so), only that the entries are notionally allocated to that player.

Although players are considered to provide respective entry fees, it will be appreciated that in some instances a single player provides multiple entry fees on multiple occasions.

Step 105 includes allocating to at least one player a supplementary prize. One or more characteristics of the supplementary prize are determined by reference to one or more characteristics of at least a portion of the collective entry data, based on that data at a point in time following the allocation of one or more primary entries to that player. A number of examples in relation to the implementation of supplementary prizes are considered below. In a simple example, the value of a supplementary prize is determined based on the total value of entry fees received from players during a predefined time period, which is readily calculated based on information in the repository of entry data.

In some embodiments a single supplementary prize is allocated to a single player. In some embodiments multiple supplementary prizes of common or varying value/nature are allocated to one or more players. In some embodiments a single or common supplementary prize is allocated to a plurality of players based on a sharing protocol.

The term "supplementary prize" is intended to describe substantially any subject matter having a real, deemed, perceived, virtual or notional value that is able to be physically or virtually allocated to a player in the context of a gaming activity. The value component of a supplementary prize is in some cases manifested as a direct player distribution, such as a prize, or in other cases an indirect player distribution, such as an entry in a gaming activity. In some embodiments the supplementary prize has components other than a value component, such as a timing component and an eligibility component, as discussed further below. Two forms of supplementary prize are particularly considered herein:

Standard supplementary prizes. In this case, whether or not a supplementary prize is to be awarded to a given player is based on the entry data received for that player.

Chance-based supplementary prizes. In this case, whether or not a supplementary prize is to be awarded to a given player is based on the outcome of a supplementary gaming activity in which that player has been allocated one or more supplementary entries.

As used herein, particularly in relation to the supplementary gaming activity, the terms "gaming" and "gaming activity" should be construed broadly so as to encompass any form of gambling, gaming, or wagering, including but not limited to:

Lotteries and lottery type games. In the context of the Australian market, particular examples include "Lotto", "Oz Lotto", "Powerball", "Art Union Lotteries", and the like. In the context of the US market, particular examples include "Hot Lotto", "Mega Millions", "Powerball", "Paycheck", and "Tri-State".

Traditional draw lotteries, instant lotteries and "scratch" lotteries.

Raffles, or other games where a player is provided with one or more unique tickets carrying respective ticket identifiers, and one or more winners are identified based on the selection of one or more winning ticket identifiers.

"Keno", "Bingo" and "Housie", "Tombola" and "Chinese Raffle" style games where players seek to reconcile their own numbers with numbers drawn from an independent objective source.

Sports betting activities and football pools, whether pari-mutuel or "fixed-odds" based.

Events-based betting activities involving such outcomes as political contests, Royal or noteworthy births, weather outcomes and natural phenomena.

Totalisators.

Sweepstakes for any events such as horse, dog or any other form of racing, sporting contests, political contests and the like.

PC-based and other electronic gaming contests, including online chance-based, skill-based or combination chance/skill-based gaming contests. These include online video games, where outcomes are in part dependant on a player's skill, and in some cases in part dependent on random factors including chance.

Other games or contests of skill and/or knowledge and/or chance.

Chance-based games played on poker and other electronic gaming machines.

Any games of skill and/or chance involving one or more unknown outcomes, whether pari-mutuel or "fixed-odds" based.

It will be appreciated that, in all of these examples, multiple players provide respective entry fees and, in exchange for the entry fees, the players are respectively provided with one or more entries.

The term "pari-mutuel" refers generally to a gaming arrangement whereby prizes are funded in whole or in part by entry fees. This term is intended to be synonymous with "paramutual", "para-mutual", "parimutuel" "mutual betting" and other variants.

The "one or more characteristics of at least a portion of the collective entry data" include either or both of characteristics of the entry data pertaining to a plurality of players and the entry data pertaining to a single one of the players. For example, in one embodiment a value component of a supplementary prize is determined by processing the total contribution to a supplementary prize pool made by a group of players, in another embodiment a value component of a supplementary prize is determined by processing the total contribution to a supplementary prize pool made by a single one of the players to whom a supplementary prize is to be allocated, and in a further embodiment a value component of a supplementary prize is determined by processing the total contribution to a supplementary prize pool made by a group of players in combination with the total contribution to a supplementary prize pool made by a single one of the players to whom a supplementary prize is to be allocated.

As noted, one or more characteristics of the supplementary prize are determined by reference to one or more characteristics of at least a portion of the collective entry data, "based on that data at a point in time following the allocation of one or more primary entries to that player". The general notion of timing here is that one or more characteristics of the supplementary prize are indeterminate at the time the primary entries are allocated. For example, in some embodiments a value component of a supplementary prize is indeterminate at the time primary entries are allocated, and determined at a later point in time when a determination is made as to which player or players are to be allocated a supplementary prize.

In the context of the present disclosure, a "method for providing a gaming activity" includes substantially any method by which a gaming activity is provided. This includes, but is not limited to, methods performable by administrators of gaming activities, methods performable by vendors of entries in gaming activities, methods performable by players, computer implemented methods performable in relation to the administration of gaming activities and/or sale of entries in such gaming activities, and so on. Likewise, a "system for providing a gaming activity" includes substantially any hardware component or group of hardware components associated with the performance of a method for providing a gaming activity. For example, such systems include information systems maintained or implemented by or on behalf of administrators of gaming activities, vendors of entries in gaming activities, or the players themselves.

As used herein, the term "gaming operator" describes a party or group of parties responsible for the carriage and administration of a gaming activity. That is, a gaming operator is responsible for tasks including, but not limited to defining entry parameters and other predefined terms and conditions for the gaming activity, offering for sale entries in exchange for entry fees, receiving entry fees from players, allocating entries to players in exchange for those entry fees, identifying one or more winning entries, and arranging for the distribution of prizes among the players. In practice, these tasks are often performed by a number of parties. For example, a first category of party (such as vendors or agents) may be responsible for offering for sale entries in exchange for entry fees and receiving entry fees from players, whilst a second party may be responsible for identifying one or more winning entries. In another example, a first category of party is responsible for providing a primary fixed-odds based gaming activity, whilst a second category of party is responsible for allocating supplementary prizes and/or providing a supplementary gaming activity. However, this is ignored for the present purposes, and the term "gaming operator" should be read sufficiently broadly so as to cover whatever group of related and/or unrelated parties are responsible for the carriage and administration of a particular gaming activity.

Thus, in some cases, a gaming activity may be provided by a plurality of parties, which might or might not be related or affiliated. Additionally, in some cases, a gaming activity may include a plurality of sub-activities, such as individual lotteries, that might in themselves be provided by differing parties. However, it should be appreciated that a plurality of such sub-activities, regardless of the nature of the relationship between providing parties, should be considered as a single gaming activity in the context of the present disclosure. In some cases, a plurality of sub-activities may be conducted by differing parties in different locations and/or with differing branding. However some or all of the entry fees from these sub-activities might be notionally or physically combined into a common pool, for example to facilitate investment, risk management or infrastructure sharing activities. In such cases, the sub-activities should certainty be collectively regarded as a single gaming activity in the context of the present disclosure.

Primary and Supplementary Prize Pools

In the embodiments presently considered, primary prizes are at least notionally funded from a primary prize pool, and supplementary prizes are at least notionally funded from a supplementary prize pool. The phrase "at least notionally" is intended to acknowledge that, in some practical implementations, distinct primary and supplementary prize pools are not maintained, and these individual "pools" merely notionally describe components of one or more collective prize pools. However, as will be appreciated from the discussion below, it is useful to consider this notional distinction between a primary and supplementary prize pool.

The term "pool" is intended to be interpreted broadly to describe a collection of valuable subject matter, including both valuable subject matter in the form of currency and/or in the form of goods/services. Although many examples considered herein, for the sake of simplicity, assume that pools describe amounts of currency, it will be appreciated that goods/services or other tradable commodities are readily included in addition or as an alternative.

The primary prize pool is funded, at least in part, by a portion of the entry fees received from players. Generally speaking, an entry fee includes a primary contribution amount, which is added to the primary prize pool, and a deductible amount, which is diverted elsewhere. For example, the deductible component might include the likes of taxes, duties, operator charges, and the like. This will be recognised as a relatively traditional approach in the context of fixed-odds gaming.

The terms "taxes" and "duties" as used herein are intended to encompass any relevant Federal, State and/or local government taxes, duties or imposts as well as levies or charges applied by intermediaries or other third parties connected with the gaming activity, that are essentially non-discretionary in so far as the gaming operators or players are concerned.

The manner by which the supplementary prize pool is funded varies between embodiments. Generally speaking, a player providing an entry fee is responsible for a respective contribution to the supplementary prize pool, referred to as a "supplementary contribution amount", which in some cases is zero. These supplementary contribution amounts at least notionally fund the supplementary prize pool. However, the nature of supplementary contribution amounts varies between embodiments. The supplementary contribution amount for a given player in some embodiments includes components having values corresponding to:

An entry fee supplementary contribution amount. For example, an operator designates that a predetermined proportion of each entry fee defines at least a component of the supplementary contribution amount for that entry fee. In some embodiments this predetermined proportion varies from player to player based on one or more aspects of the entry data received from that player. For example, a greater predetermined proportion is applied in respect of specified events, or where there is at least a threshold time separation between the receipt of an entry fee and the anticipated time at which the corresponding event outcome is to be determined.

A net investment return derived from subjecting the entry fee to an investment procedure for a period of time (such as from the time the entry fee is received to the time primary prizes are allocated). The investment procedure results in the generation of a gross investment return, and of this, an amount corresponding to the value of a net investment return defines a component of a player's supplementary contribution amount. In some cases this is an anticipated net investment return, which is anticipated in advance based on the quantum of entry fee received, the time for which the entry fee will be in the care of the operator, and a baseline anticipated rate of net return, which is typically conservatively calculated.

A net distribution marketing amount. For example, a third party provides a gaming operator with a gross distribution marketing amount (such as currency or goods/services) in consideration for marketing information being provided to a player. Of this gross distribution marketing amount, a value corresponding to a net distribution marketing amount provides a component of the player's supplementary contribution amount. In some cases, a player receives a ticket (physical or electronic) as a receipt for placing an entry fee, and this ticket carries the relevant marketing information. In some cases a player is able to increase his/her net distribution marketing amount by receiving further marketing material—for example by viewing electronic advertisements.

A net collection marketing amount. This is similar to the example considered above, however is derived from collecting information from players, such as personal information or opinion information. For example, in some cases a player is able to increase his/her net collection marketing amount by participating in a survey.

Other net third party contribution amounts.

This is by no means an exclusive list, and alternative embodiments make use of a wider range of possible supplementary contribution amounts.

There is discussion in the above examples of "gross" amounts and "net" amounts. The terms "gross" and "net" are used in a descriptive sense only as follows. The term "gross" refers to an amount derived by the gaming operator, and the term "net" refers to an amount that is added to the supplementary contribution amount. In some cases the net amount is the corresponding gross amount less any applicable taxes, levies or operator charges. In other cases there is no direct nexus between the gross and net amounts.

For each player, the entry data maintained in the repository of collective entry data includes information indicative of the supplementary contribution amount for that player. It will be appreciated that, in this way, the collective entry data is therefore indicative of the total of the supplementary contribution amounts for all players, the sum of which in some embodiments defines the supplementary prize pool. However, in other embodiments the supplementary prize pool includes additional components, some of which being discussed further below.

Figure 2:
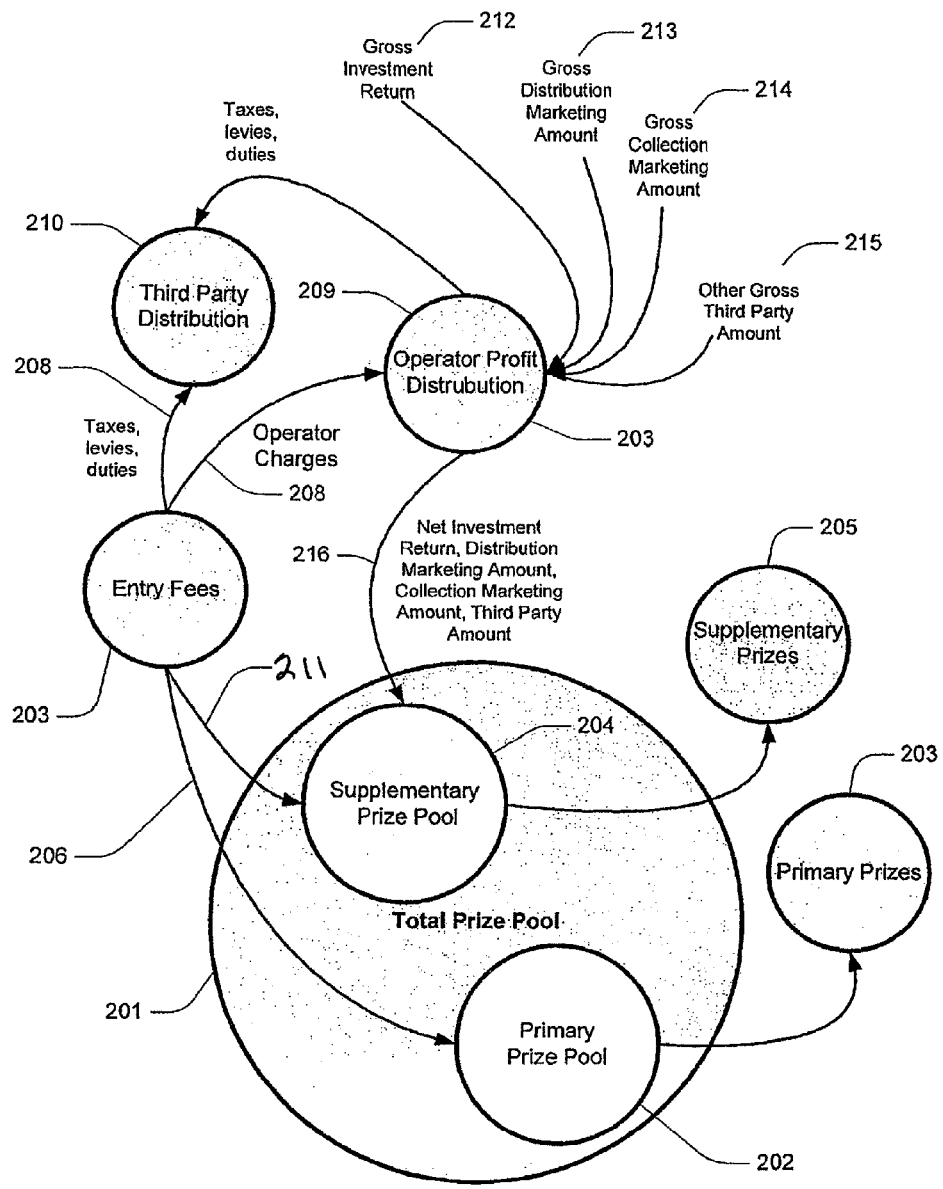
FIG. 2 illustrates a method for providing a gaming activity according to one embodiment.

FIG. 2 schematically illustrates prize pools according to one embodiment. A total prize pool 200 includes a primary prize pool 201 for funding primary prizes 202 and a supplementary prize pool 203 for funding supplementary prizes 204. Entry fees 205 are received from players. Of these entry fees, a primary contribution amount 206 is added to pool 201, and a deductible amount 208 is diverted to an operator profit distribution location 209 (operator charges/commissions, for example) and to a third party distribution location 210 (taxes and levies, for example). An entry fee supplementary contribution amount 211 is also shown as being added to supplementary pool 203, however in some embodiments this amount is zero.

A gross investment return 212, gross distribution marketing amount 213, gross collection marketing amount 214, and other gross third party contribution amount 215 are received in the operator profit distribution location 209. Of these, net amounts 216 are added to supplementary pool 203. Residual components are maintained by the operator and/or provided to distribution location 210.

Unclaimed/Abandoned Prizes

In some embodiments, unclaimed prizes are used to increase the value of the supplementary prize pool. Inevitably, for at least some primary or supplementary prizes, there will be a delay between the time at which these prizes are made available for collection by players and the time at which funds are actually obtained by players. During this delay, the funds are considered to be "unclaimed prizes" (noting that these, at least in some cases, include both prizes and refunds). In some cases, upon the expiration of a predetermined time period, it is deemed that certain unclaimed prizes will never be obtained by the relevant player or players, and these are categorised as "abandoned prizes" (again, noting that these, at least in some cases, include both prizes and refunds). In some embodiments, some of all of the unclaimed prizes are subjected to an investment procedure to derive investment income. At least a portion of this investment income is then periodically added to the supplementary prize pool. In some embodiments, abandoned prizes themselves are also added to the supplementary prize pool.

Relevance of Contribution

In some embodiments, the relative contribution a player makes to the supplementary prize pool affects the likelihood of that player being allocated a supplementary prize and/or the value of supplementary prize that might be allocated to that player. Specific examples are considered further below.

Embodiments of the present invention particularly arise from a realization that a player's total contribution to a gaming activity, at least in some instances, is notionally or physically greater in value than that player's entry fee by virtue of supplementary contribution. This supplementary contribution, at least notionally, is used to fund supplementary payouts or player participation in a supplementary gaming activity.

OVERVIEW OF VARIOUS EMBODIMENTS

A number of embodiments are discussed below. These are described both by reference to technical subject matter (such as computer implemented methods and associated hardware components), and by reference to practical gaming considerations. The latter is provided predominately to assist a reader in understanding the benefits of the various embodiments. However, those skilled in the art will appreciate how technical subject matter and practical gaming considerations are inherently interrelated. For example, it will be appreciated that by "offering players a selection between a hypothetical Option A and Option B" inherently implies that technical features are provided for allowing the receipt by a computing system of data indicative of a user selection of either Option A or Option B.

In overview, the following broad categories of embodiments are discussed below:

Minimum fixed-odds: These embodiments provide fixed-odds gaming activities whereby winning players (that is, players who select winning outcomes) receive a total prize that has a value greater than a primary prize based on the entry fee provided and the payout ratio defined for the selected event outcome.

Chance-based minimum fixed-odds: In these embodiments, winning players receive a total prize that has a value greater than or equal to a primary prize based on the entry fee provided and the payout ratio defined for the selected event outcome. The total prize is greater than the primary prize for a given player where that player is successful in a supplementary gaming activity.

Reduced liability: These embodiments provide fixed-odds gaming activities whereby losing players (that is, players who do not select winning outcomes) receive supplementary prizes which essentially provides a refund of a portion of their entry fees.

Chance-based reduced liability: In these embodiments, losing players receive one or more chances to receive a refund of a portion of their entry fees, or in some cases a supplementary prize having value greater than the provided entry fees.

Magnified winnings: The general premise behind these embodiments is that a player's supplementary contribution amount is used to magnify that player's potential winnings in respect of a given entry fee and defined payout ratio.

Hedged reduced liability: In these embodiments, a player essentially reduces his/her liability in relation to an entry fee by providing a hedged entry fee.

Fixed-odds plus: In these embodiments, each player for whom the received entry data meets predetermined criteria is awarded one or more entries in a supplementary gaming activity.

Scratching bonus: In some fixed-odds gaming activities, certain event outcomes are "scratched", this occurring where there is a certainty that the relevant event outcome will not be identified as a winning outcome. For example, this might occur where a sporting event is cancelled, or a horse is withdrawn from a race. In these embodiments, players who select event outcomes that are scratched are awarded one or more entries in a supplementary gaming activity.

In each of these categories, one or more characteristics of the supplementary prize or prizes are determined by reference to one or more characteristics of at least a portion of the collective entry data, based on that data at a point in time following the allocation of one or more primary entries to that player.

In some implementations, players are made aware of supplementary payouts and/or supplementary gaming activities. However, in other implementations, players are not made aware of supplementary payouts and/or supplementary gaming activities. It will be appreciated that the selection between these possibilities is predominantly a marketing consideration.

Minimum Fixed-Odds

These embodiments provide fixed-odds gaming activities whereby winning players (that is, players who select winning outcomes) receive a total prize that has a value greater than a primary prize based on the entry fee provided and the payout ratio defined for the selected event outcome.

In some embodiments, a player is allocated a supplementary prize in addition to the primary prize if, for that player, the selected event outcome is identified as the winning outcome. That is, the supplementary prize essentially supplements a primary prize. Such examples are, for the purposes of the present disclosure, identified by the term "minimum fixed-odds". The general notion is that, unlike in traditional fixed-odds gaming activities where the total prize winnable by a player is simply the entry fee provided by that player subjected to the applicable payout ratio, the total prize winnable in a minimum fixed-odds environment is indeterminate at the time the entry fee is placed. In particular, the entry fee is placed subject to a minimum payout ratio, and in the event that the selected event outcome is identified as a winning outcome, the player receives a prize of value equal to or greater than the entry fee as subjected to the payout ratio.

Figure 3:
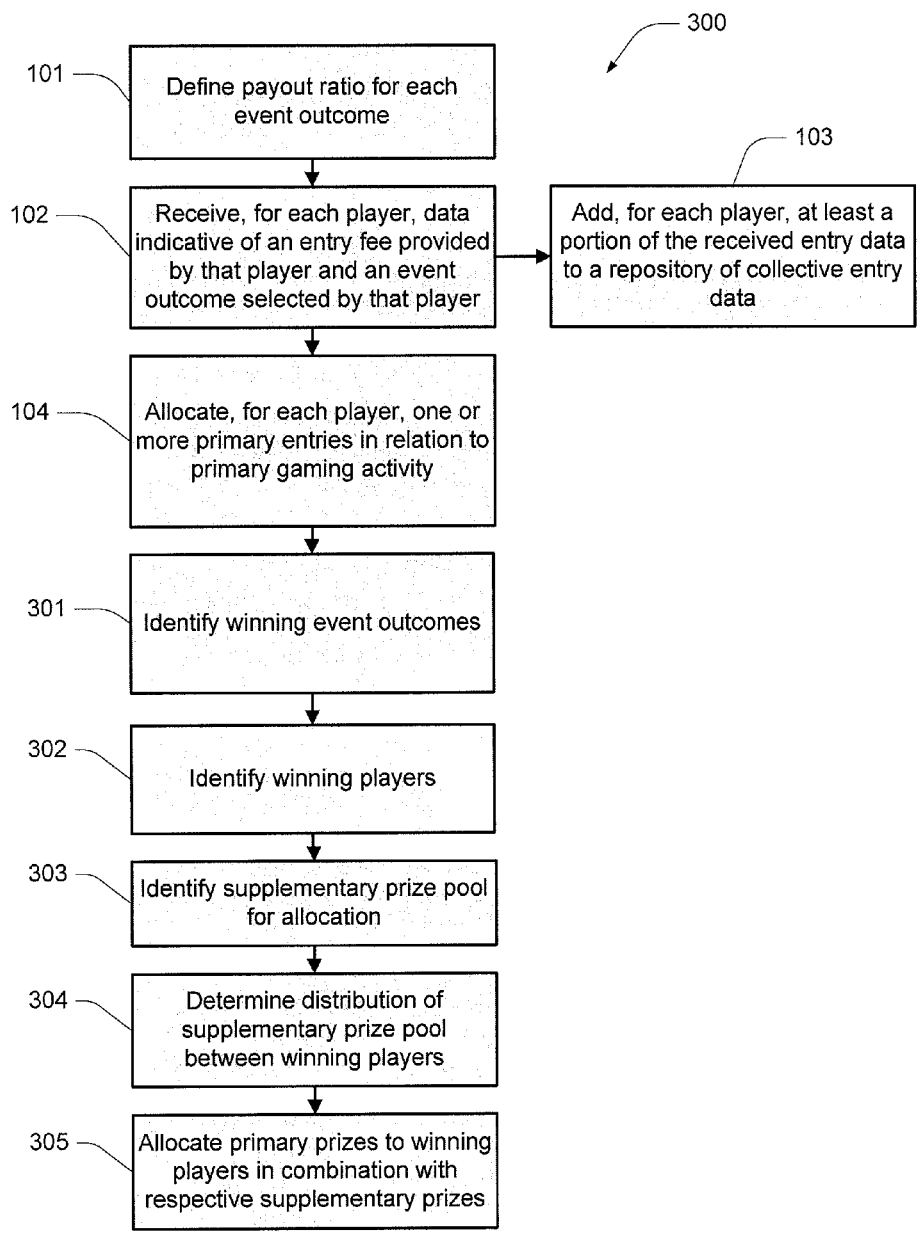
FIG. 3 illustrates a method for providing a gaming activity according to one embodiment.

FIG. 3 schematically illustrates a minimum fixed-odds method 300. Step 301 includes receiving data indicative of winning outcomes in relation to the primary gaming activity. Step 302 includes, on the basis of data indicative of identified winning event outcomes, querying the repository of collective entry data to identify one or more winning players.

At step 303, a portion of the supplementary prize pool is identified for allocation. In some embodiments, step 303 includes identifying all players for whom entry fees were received in respect of events for which winning event outcomes were identified at step 301. On the basis of the collective entry data, the respective supplementary contribution amounts for those players are then summed to define the portion of the supplementary prize pool for allocation. In some embodiments the prize pool is monetary, whilst in some embodiments it includes either or both of monetary and non-monetary prizes having a total designated value corresponding to the value of the portion of the supplementary prize pool for allocation.

Step 304 includes determining a distribution protocol for distributing the portion of the supplementary prize pool identified at step 303 between the winning players identified at step 302. In some embodiments, this distribution protocol is related to the winning players' respective supplementary contribution amounts. In particular, for each winning player, that player's respective supplementary contribution amount is divided by the sum of the winning players' respective supplementary contribution amounts to define, for that winning player, a distribution percentage. This distribution percentage is applied to the portion of the supplementary prize pool identified at step 303 to determine the proportion of that prize pool that is to be allocated to that player as a supplementary prize.

Step 305 includes allocating, to each player, a total prize comprising a primary prize (based on the player's entry fee and the payout ratio for the selected event outcome) and a supplementary prize as determined at step 304.

It will be appreciated that the total prize allocated to a given player at step 305 is larger than the primary prize, and therefore the player has therefore essentially received a greater effective payout ratio than would have been the case in a traditional fixed-odds game. In some embodiments this effective payout ratio is calculated and communicated to the player. As a simple numerical example, assume a player bets $1 on an event outcome having a payout ratio of 5:1 and that event outcome is a winning event outcome. Further assume that the player receives a supplementary payout of $2. The player's total prize is therefore $7, meaning that the effective payout ratio is 7:1.

Chance-Based Minimum Fixed-Odds

In these embodiments, winning players receive a total prize that has a value greater than or equal to a primary prize based on the entry fee provided and the payout ratio defined for the selected event outcome. The total prize is greater than the primary prize for a given player where that player is successful in a supplementary gaming activity.

Figure 4:
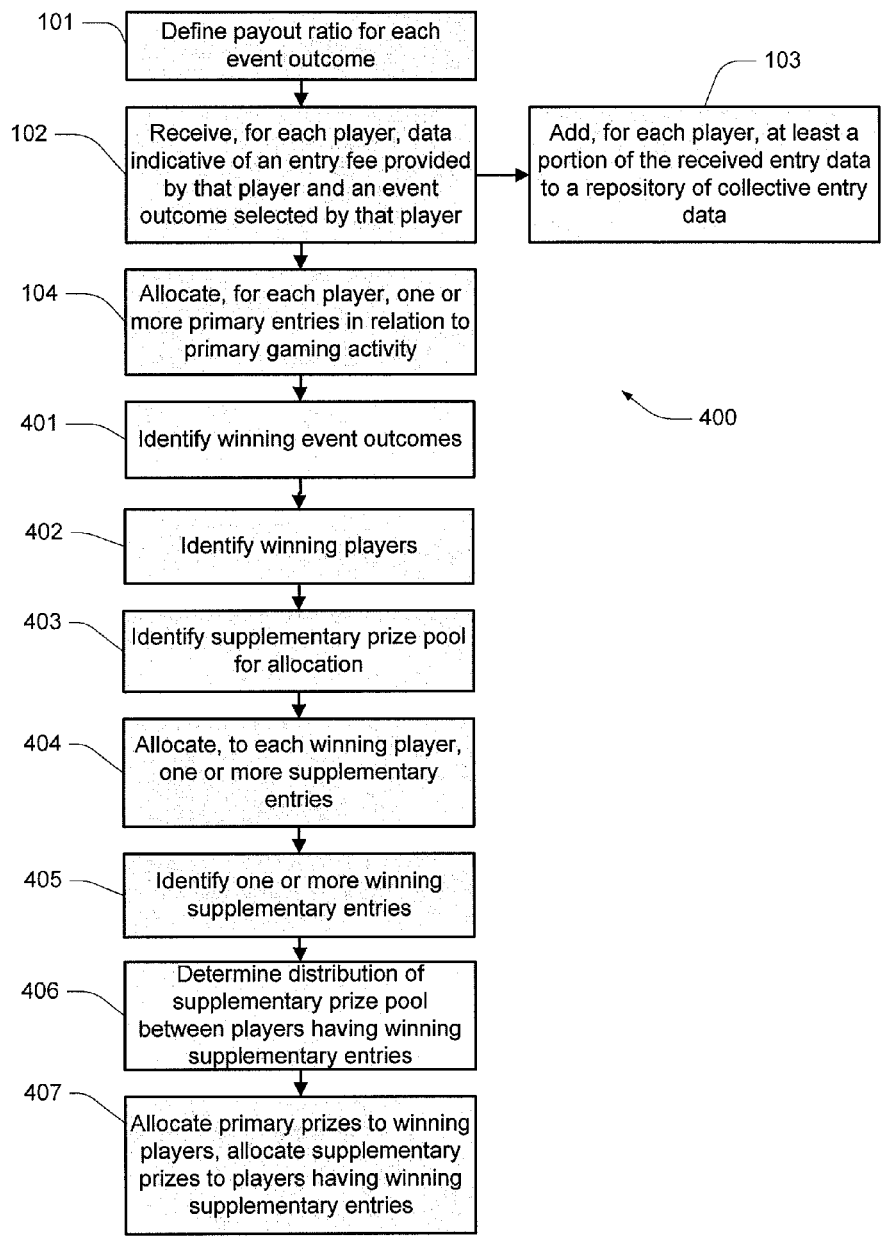
FIG. 4 illustrates a method for providing a gaming activity according to one embodiment.

Method 400 of FIG. 4 illustrates an example of such an embodiment. Step 401 includes receiving data indicative of winning outcomes in relation to the primary gaming activity. Step 402 includes, on the basis of data indicative of identified winning event outcomes, querying the repository of collective entry data to identify one or more winning players.

At step 403, a portion of the supplementary prize pool is identified for allocation. In some embodiments, step 403 includes identifying all players for whom entry fees were received in respect of events for which winning event outcomes were identified at step 401. On the basis of the collective entry data, the respective supplementary contribution amounts for those players are then summed to define the portion of the supplementary prize pool for allocation. In some embodiments the prize pool is monetary, whilst in some embodiments it includes either or both of monetary and non-monetary prizes having a total designated value corresponding to the value of the portion of the supplementary prize pool for allocation.

Step 404 includes allocating to each winning player one or more supplementary entries in a supplementary gaming activity, which, in the present example, is a pari-mutuel gaming activity. The number of supplementary entries allocated to a given player is, in some embodiments, related to that player's supplementary contribution amount. In particular, the greater the supplementary contribution amount for a given player, the more supplementary entries awarded to that player. As such, players who make a comparatively greater supplementary contribution amount (for example by providing a larger entry fee or participating in additional marketing related activities) have a comparatively greater relative probability of winning a supplementary prize.

Step 405 includes identifying one or more winning entries for the supplementary gaming activity. The nature of step 405 depends to a greater extent on the nature of the supplementary gaming activity. For example, the supplementary gaming activity might be a sweepstakes, a raffle, a lottery, or another draw based game. In some cases there is a single winning entry, in other cases there are multiple winning entries. Where there are multiple winning entries, these may be ranked so as to receive different levels/categories/values of supplementary prize.

Step 406 includes, on the basis of a predetermined distribution protocol, determining the portions of the supplementary prize pool identified at step 403 for allocation to each player to whom winning entries were awarded at step 401.

Step 407, in this case, includes allocating, to each player, a total prize comprising a primary prize (based on the player's entry fee and the payout ratio for the selected event outcome) and, for players who were allocated winning supplementary entries, a supplementary prize as determined at step 406.

It will be appreciated that the total prize allocated to a given player at step 407 is, for one or more of the players, larger than the primary prize. For those players, a greater effective payout ratio has essentially been achieved than would have been the case in a traditional fixed-odds game. In some embodiments this effective payout ratio is calculated and communicated to the relevant players.

Reduced Liability

These embodiments provide fixed-odds gaming activities whereby losing players (that is, players who do not select a winning outcome) receive a supplementary prize which essentially provides a refund of a portion of their entry fees.

Figure 5:
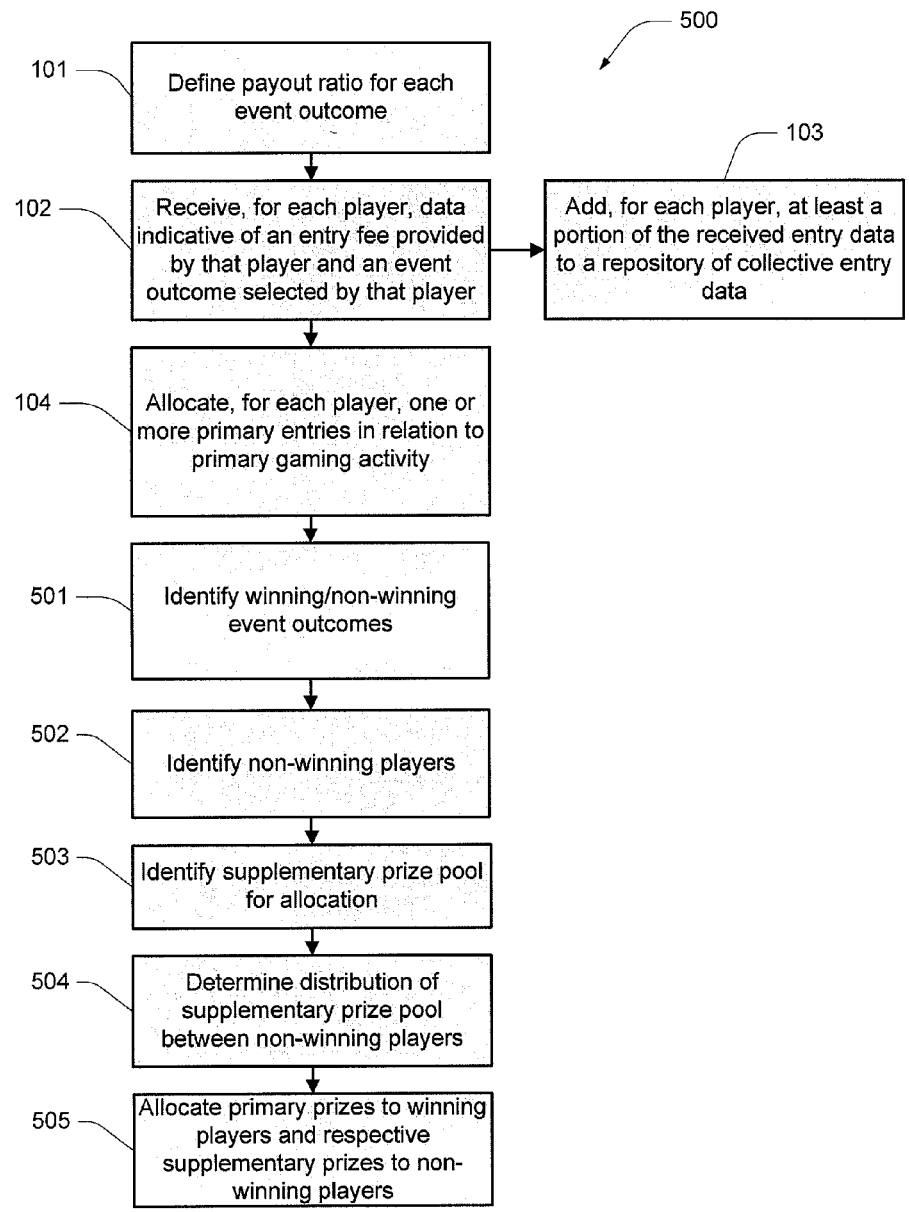
FIG. 5 illustrates a method for providing a gaming activity according to one embodiment.

Referring to FIG. 5, a standard reduced liability method 500 is relatively similar to method 300. Step 501 includes receiving data indicative of non-winning outcomes in relation to the primary gaming activity. Step 502 includes, on the basis of data indicative of identified winning event outcomes for one or more events, querying the repository of collective entry data to identify one or more non-winning players in relation to the same one or more events.

It will be appreciated that data indicative of winning outcomes is essentially indicative of non-winning outcomes by exclusion.

At step 503, a portion of the supplementary prize pool is identified for allocation. In some embodiments, step 503 includes identifying all players for whom entry fees were received in respect of events for which non-winning event outcomes were identified at step 501. On the basis of the collective entry data, the respective supplementary contribution amounts for those players are then summed to define the portion of the supplementary prize pool for allocation. In some embodiments the prize pool is monetary, whilst in some embodiments it includes either or both of monetary and non-monetary prizes having a total designated value corresponding to the value of the portion of the supplementary prize pool for allocation.

Step 504 includes determining a distribution protocol for distributing the portion of the supplementary prize pool identified at step 503 between the non-winning players identified at step 502. In some embodiments, this distribution protocol is related to the non-winning players' respective supplementary contribution amounts. In particular, for each non-winning player, that player's respective supplementary contribution amount is divided by the sum of the non-winning players' respective supplementary contribution amounts to define, for that non-winning player, a distribution percentage. This distribution percentage is applied to the portion of the supplementary prize pool identified at step 503 to determine the proportion of that prize pool that is to be allocated to that player as a supplementary prize.

Step 505 includes allocating, to each winning player (in the contest of the primary gaming activity), a primary prize (based on the player's entry fee and the payout ratio for the selected event outcome) and, to each non-winning player (in the context of the primary gaming activity), a supplementary prize as determined at step 504.

In this case, the extent to which a player is at-risk in relation to an entry fee is essentially reduced. In fact, under certain conditions, it is possible for a player to be allocated a more valuable prize where his/her fixed-odds bet loses (i.e. where the selected outcome is not identified as a winning outcome).

Chance Based Reduced Liability

In these embodiments, losing players (that is, players who do not select a winning outcome) receive one or more chances to receive a refund of a portion of their entry fees.

Figure 6:
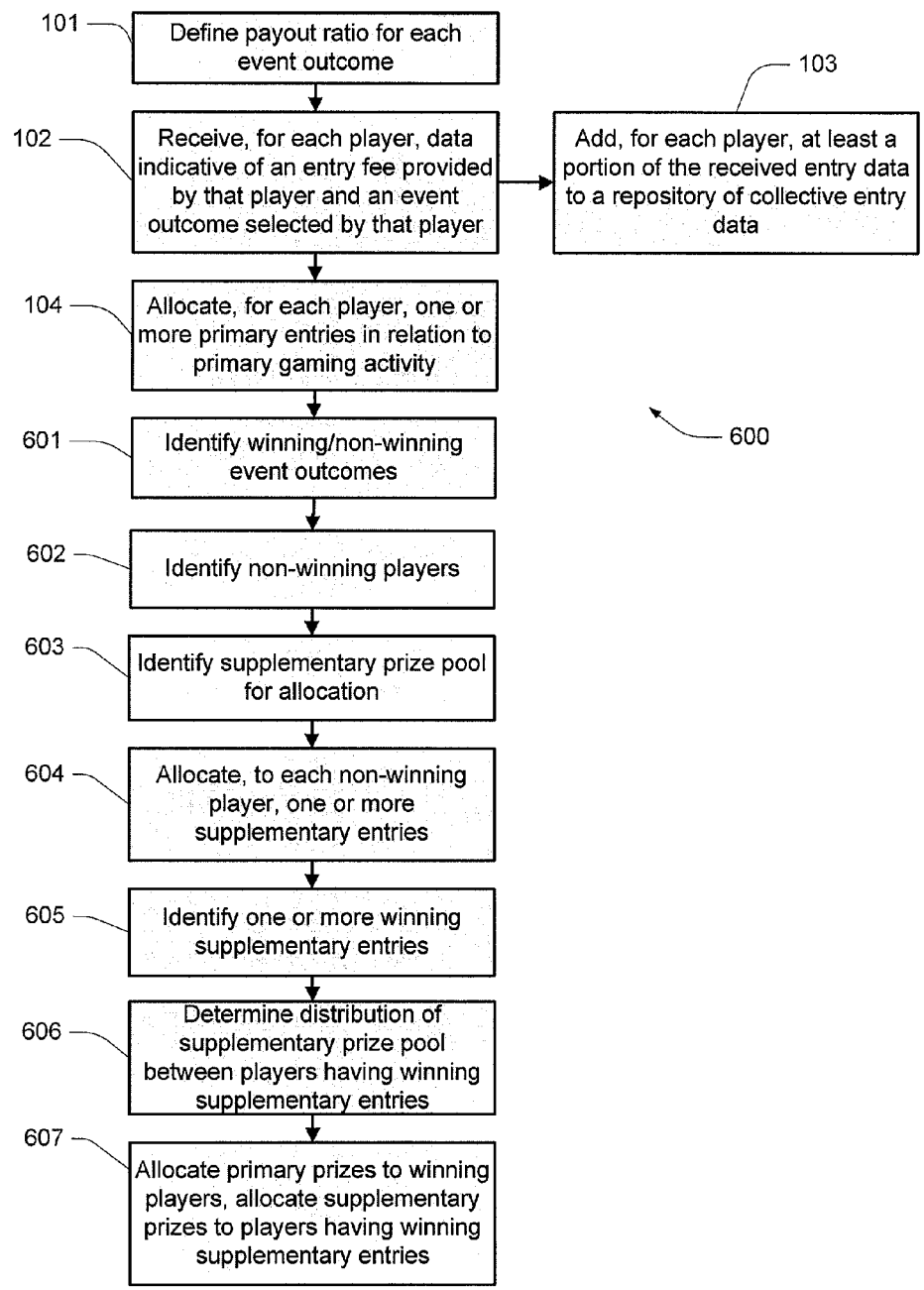
FIG. 6 illustrates a method for providing a gaming activity according to one embodiment.

Method 600 of FIG. 6 illustrates an example of such an embodiment. Step 601 includes receiving data indicative of non-winning outcomes in relation to the primary gaming activity. Step 602 includes querying the repository of collective entry data to identify one or more non-winning players.

At step 603, a portion of the supplementary prize pool is identified for allocation. In some embodiments, step 603 includes identifying all players for whom entry fees were received in respect of events for which non-winning event outcomes were identified at step 601. On the basis of the collective entry data, the respective supplementary contribution amounts for those players are then summed to define the portion of the supplementary prize pool for allocation. In some embodiments the prize pool is monetary, whilst in some embodiments it includes either or both of monetary and non-monetary prizes having a total designated value corresponding to the value of the portion of the supplementary prize pool for allocation.

Step 604 includes allocating to each non-winning player one or more supplementary entries in a supplementary gaming activity, which, in the present example, is a pari-mutuel gaming activity. The number of supplementary entries allocated to a given player is, in some embodiments, related to that player's supplementary contribution amount. In particular, the greater the supplementary contribution amount for a given player, the more supplementary entries awarded to that player. As such, players who make a comparatively greater supplementary contribution amount (for example by providing a larger entry fee or participating in additional marketing related activities) have a comparatively greater relative probability of winning a supplementary prize.

Step 605 includes identifying one or more winning entries for the supplementary gaming activity. The nature of step 605 depends to a greater extent on the nature of the supplementary gaming activity. For example, the supplementary gaming activity might be a sweepstakes, a raffle, a lottery, or another draw based game. In some cases there is a single winning entry, in other cases there are multiple winning entries. Where there are multiple winning entries, these may be ranked so as to receive different levels/categories/values of supplementary prize.

Step 606 includes, on the basis of a predetermined distribution protocol, determining the portions of the supplementary prize pool identified at step 603 for allocation to each player to whom winning entries were awarded at step 601.

Step 607, in this case, includes allocating, to each winning player, a primary prize (based on the player's entry fee and the payout ratio for the selected event outcome) and, to each non-winning player who was allocated a winning entry in the supplementary gaming activity, a supplementary prize as determined at step 606.

It will be appreciated that, in such embodiments, a player who is unsuccessful in the primary fixed-odds gaming activity is afforded an opportunity to win a prize having a value that, in some cases, might provide a partial refund of entry fees, might be greater then the entry fee provided, or might even be greater in value than the possible primary prize.

Magnified Winnings

The general premise behind these embodiments is that a player's supplementary contribution amount is used to magnify that player's winnings in respect of the entry fee provided. In these embodiments, the primary prize winnable by a player is based on the relevant payout ratio applied to the sum of the player's entry fee and supplementary contribution amount (which, in some cases, is calculated at the time of entry). As such, noting that the payout ratio is applied to an amount greater than a player's entry fee, a player is essentially able to achieve a more beneficial effective payout ratio based on the quantum of his/her provided entry fee by providing a greater supplementary contribution amount. As a simple numerical example, assume a player provides an entry fee of $1 in relation to an event outcome having a payout ratio of 5:1, and that event outcome is a winning event outcome. Further assume that the player's supplementary contribution amount is $1, this being is essentially added to the primary entry fee, making for a $2 total bet (of which only $1 is directly funded by the player, the other $1 being funded by supplementary contribution). The player's prize, in this case, is therefore $10 ($2 at 5:1), meaning that the effective payout ratio is 10:1 (on the $1 entry fee).

A greater supplementary contribution amount might be provided by either or both of the following manners:

Option A: Providing an additional fully refundable sum of money in combination with the entry fee.

Option B: Participating in additional marketing activities.

These are considered as examples only, and additional options are provided in further embodiments.

In the context of Option A, at the time of selecting an event outcome, a player is offered a plurality of payout ratios, each payout ratio being associated with a hedge multiplier. By selecting a payout ratio, the player agrees to provide, in addition to an entry fee $A, a fully refundable hedge amount $B, which is a multiple of $A based on the applicable hedge multiplier. In some cases the hedge multiplier varies with time, as will be appreciated from the discussion below.

Assume, for the sake of a simple example, that the supplementary contribution amount for a given player is an anticipated net investment return, and that the anticipated net investment return is derived at a rate of C % of the funds invested over the timeframe between receiving funds and allocating prizes. In this case, the supplementary contribution amount for a player who provides an entry fee of $A and a hedge amount of $B is given by $((A+B).(C %)). Now, assume a base payout ratio of X:1. That is, a player who provides an entry fee of $A, with no hedge amount, is eligible to receive a primary prize of $(A.X). Under the present embodiments, a player who provides an entry fee of $A, with a hedge amount of $B is eligible to win a primary prize of $((A+B).(C %).X). That is, by providing a hedge amount of $B, the primary prize winnable increases by (((A+B).(C %))/A) %. It will be appreciated how this general relationship is used to calculate appropriate hedge amounts and corresponding payout ratios.

In the context of Option B, the anticipated supplementary contribution amount from participation in marketing activates is calculated, and from this appropriate payout ratios for various levels of participation are calculated in a similar manner to that described above.

Figure 7:
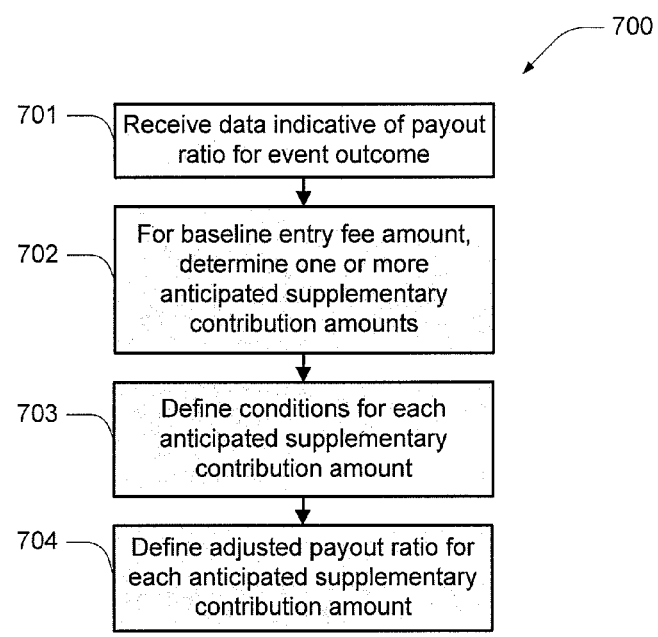
FIG. 7 illustrates a method for providing a gaming activity according to one embodiment.

A general hedged payout method is provided by method 700 of FIG. 7. Step 701 includes receiving data indicative of a payout ratio for a given event outcome. Step 702 includes, for a baseline entry fee amount, determining one or more anticipated supplementary contribution amounts. For each of these anticipated supplementary amounts, respective conditions are defined at step 703, these conditions generally identifying steps a player should take to achieve the relevant supplementary contribution amount (for example, participation in marketing activities or provision of a hedge amount). Step 704 includes defining, for each anticipated supplementary contribution amount, a respective adjusted payout ratio that a player is able to realize if the conditions defined at step 703 are satisfied.

Hedged Reduced Liability

In these embodiments, a player essentially reduces his/her liability in relation to an entry fee by providing a hedged entry fee.

In overview, the entry fee is, in the conventional manner, exchanged for an entry in the primary fixed-odds gaming activity. The hedged entry fee is exchanged for one or more auxiliary entries in an auxiliary gaming activity, in the present examples being a pari-mutuel gaming activity. The hedged entry fee is fully refundable in the case of a no-win in respect of the auxiliary gaming activity. The general notion is that the primary entry is eligible to win a primary prize, and the hedged entries are eligible to win supplementary prizes, each supplementary prize including a refund of the corresponding hedge entry fee plus a component funded by net investment return on at least a portion of the standard entry fees and/or hedge entry fees.

The following table provides possible outcomes in relation to no hedge, partial hedges, and full hedges:

| | No Hedge | Partial Hedge | Full Hedge |
|---|---|---|---|
| Primary Entry Win/Hedge Entry Loss | Win primary prize | Win primary prize Receive refund of hedge entry fee | Win primary prize Receive refund of hedge entry fee |
| Hedge Entry Win/Primary Entry Loss | No win/refund | Win supplementary prize (greater than hedge entry fee) | Win supplementary prize (greater than hedge entry fee) |
| Primary Entry Loss/Hedge Entry Loss | No win/refund | Receive refund of hedge entry fee | Not possible |

Figure 8:
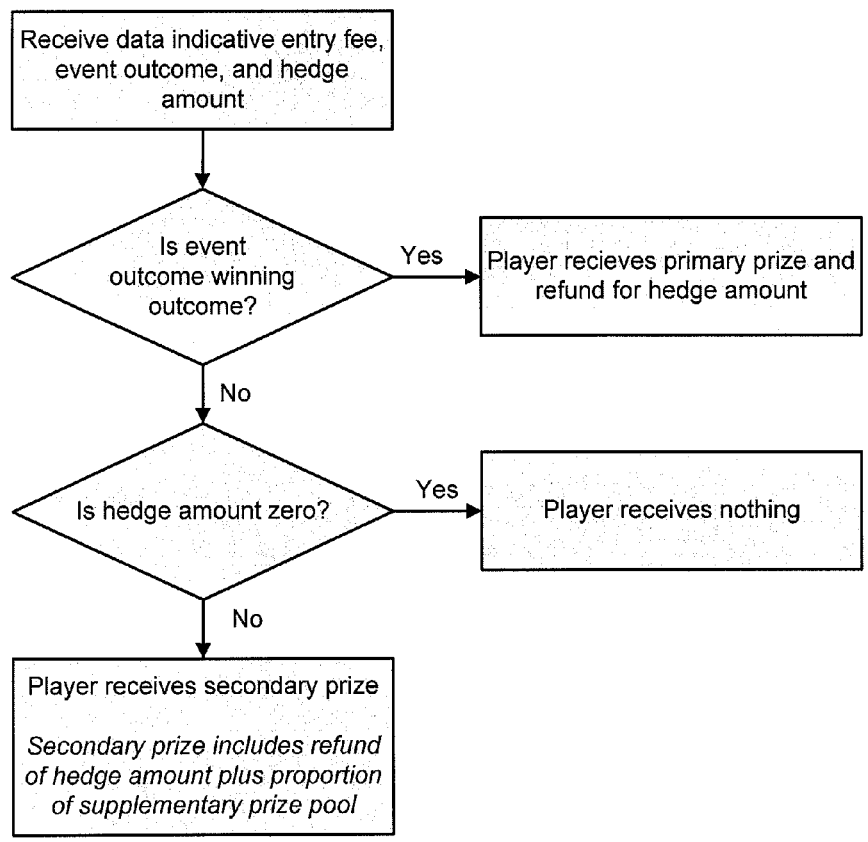
FIG. 8 is tabular representation of one embodiment of the invention reflecting hedged reduced liability.

FIG. 8 generally represents this table in the form of a flowchart.

The allocation of supplementary prizes is either based on a standard approach (such as method 300 and 500) or a chance based approach (such as methods 400 and 600). In either case, it will be appreciated that a player is essentially offered the ability to play on the basis of a reduced level of liability.

Fixed-Odds Plus

In these embodiments, each player for whom the received entry data meets predetermined criteria is awarded one or more entries in a supplementary gaming activity.

Figure 9:
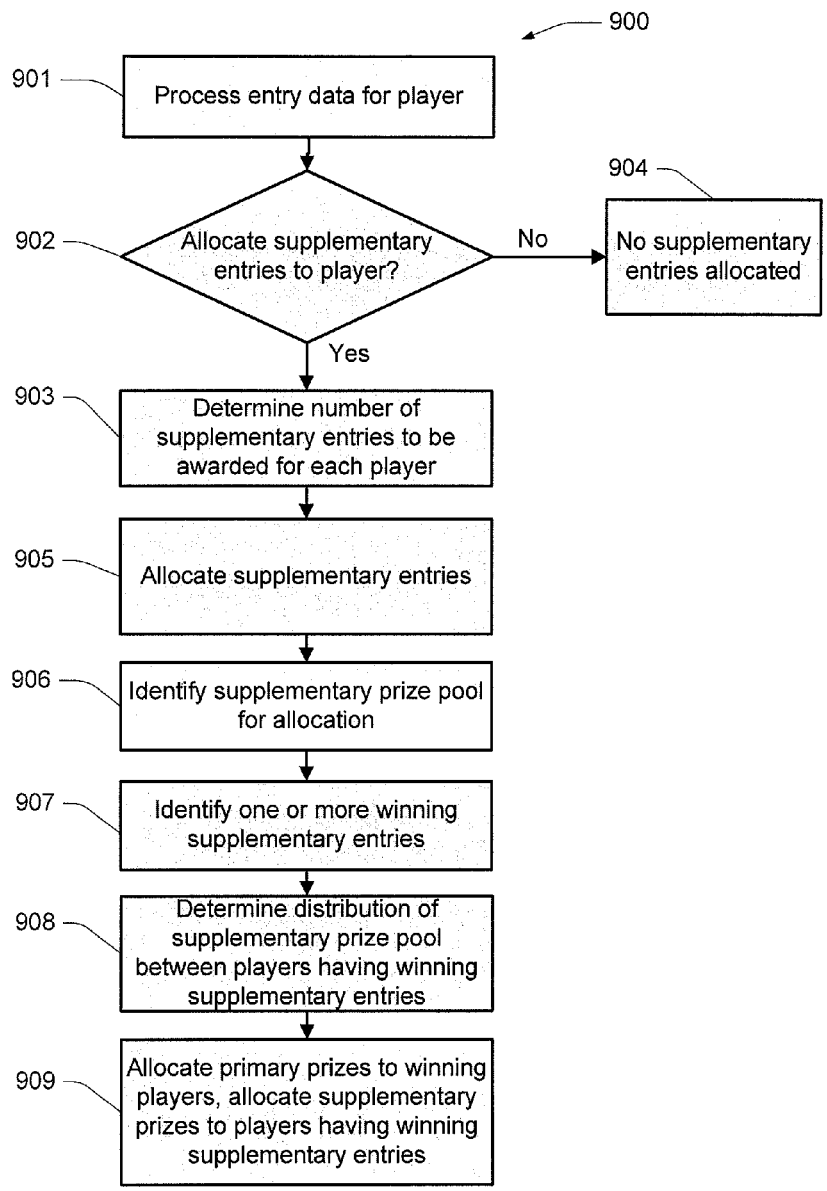
FIG. 9 illustrates a method for providing a gaming activity according to one embodiment.

FIG. 9 illustrates a method 900 according to one such embodiment. Method 900 commences at step 901. Step 901 is commenced either on a player-by-player basis upon the receipt of a entry fee, or for a plurality of players at other predetermined times. These predetermined times are in some cases determined by a predefined schedule, and in other cases determined by one or more characteristics of the entry data (such as the number of players, the number of players betting on a specified event, the total entry fees received, the total entry fees received in relation to a given event, or the total entry fees received in a specified timeframe).

Step 901 includes, for a given player, processing the entry data to determine whether or not to allocate one or more entries in a supplementary gaming activity at decision 902. For example, in various embodiments there is a requirement that a player make a threshold supplementary contribution amount, and/or provide a threshold level of entry fee, and/or submit an entry fee in a specified time period, and/or select an event outcome in relation to a specified event, and/or meet other criteria. In the event that it is determined that one or more supplementary entries are to be awarded, the method progresses to step 903. Otherwise no supplementary entries are awarded at step 904.

Step 903 includes, for a given player, determining a number of supplementary entries that are to be awarded. In some cases this number is related to the supplementary contribution amount provided by that player, as in examples considered above. These entries are allocated at step 905.

At step 906, a portion of the supplementary prize pool is identified for allocation. In some embodiments, step 906 includes identifying all players for whom supplementary entries have been allocated. On the basis of the collective entry data, the respective supplementary contribution amounts for those players are then summed to define the portion of the supplementary prize pool for allocation. In some embodiments the prize pool is monetary, whilst in some embodiments it includes either or both of monetary and non-monetary prizes having a total designated value corresponding to the value of the portion of the supplementary prize pool for allocation.

Step 907 includes identifying one or more winning entries for the supplementary gaming activity. The nature of step 907 depends to a greater extent on the nature of the supplementary gaming activity. For example, the supplementary gaming activity might be a sweepstakes, a raffle, a lottery, or another draw based game. In some cases there is a single winning entry, in other cases there are multiple winning entries. Where there are multiple winning entries, these may be ranked so as to receive different levels of supplementary prize.

Step 908 includes, on the basis of a predetermined distribution protocol, determining the portions of the supplementary prize pool identified at step 906 for allocation to players to whom wining supplementary entries were allocated.

Step 909 includes allocating, to player to whom a winning supplementary entry was awarded a supplementary prize as determined at step 908.

It will be appreciated that, in such embodiments, supplementary prizes are awarded irrespective of the outcome or timing primary gaming activity. For example, players compete for supplementary prizes on an ongoing basis, for example subject to a periodic supplementary prize draw (i.e. steps 906 to 909 are periodically repeated, either randomly, on a schedule, or responsive to one or more characteristic of the collective entry data).

Scratching Bonus

In some fixed-odds gaming activities, certain event outcomes are "scratched", this occurring where there is a certainty that the relevant event outcome will not be identified as a winning outcome, for example due to a participant withdrawal, disqualification, event cancellation, or the like. For example, this might occur where a sporting event is cancelled, or a horse is withdrawn from a race. In these embodiments, players who select event outcomes that are scratched are awarded one or more entries in a supplementary gaming activity.

Figure 10:
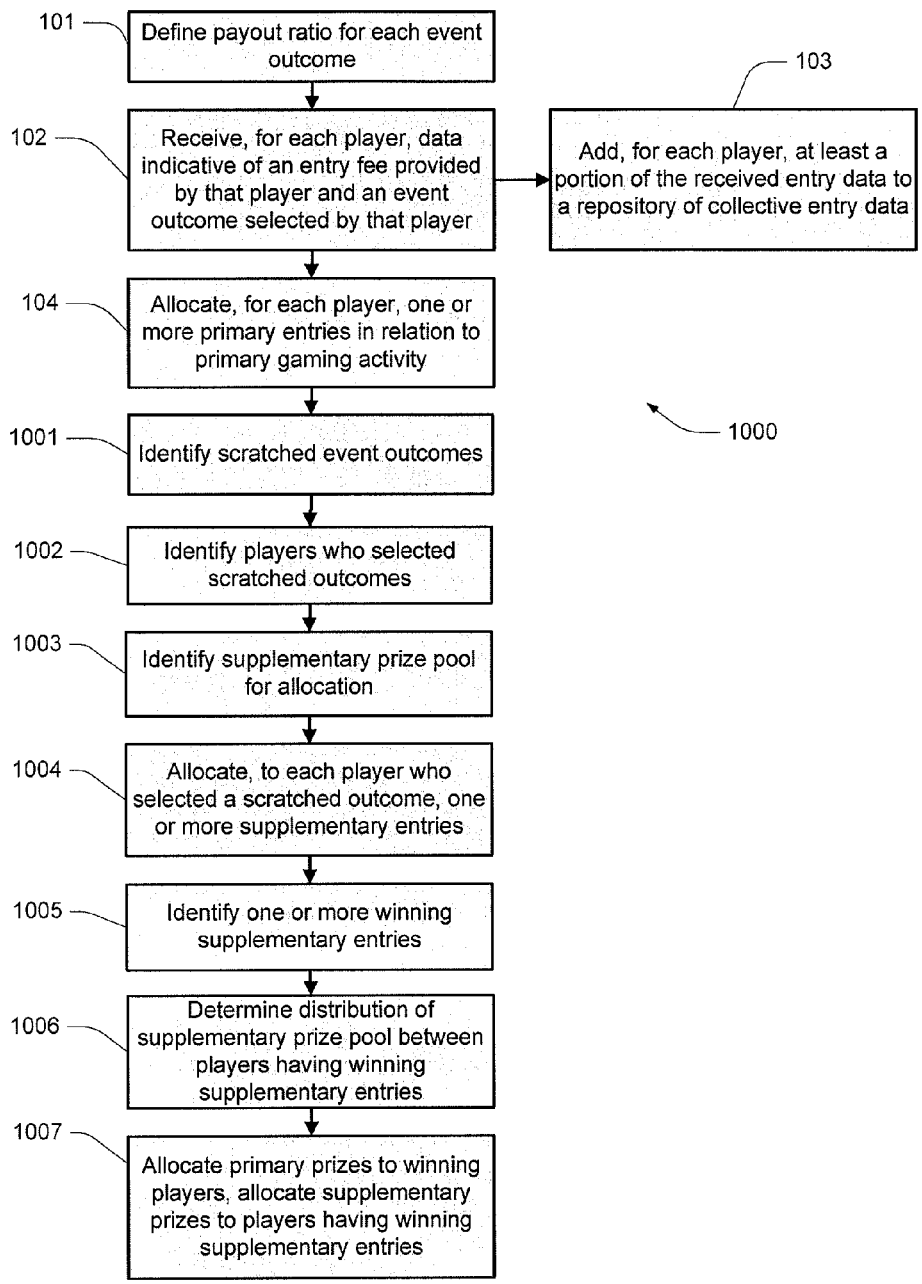
FIG. 10 illustrates a method for providing a gaming activity according to one embodiment.

Method 1000 of FIG. 10 illustrates an example of such an embodiment. Step 1001 includes receiving data indicative of scratched outcomes in relation to the primary gaming activity. Step 1002 includes, on the basis of data indicative of identified winning event outcomes, querying the repository of collective entry data to identify one or more players who selected scratched outcomes.

At step 1003, a portion of the supplementary prize pool is identified for allocation. In some embodiments, step 1003 includes identifying all players for whom entry fees were received in respect of events for which scratched event outcomes were identified at step 1001. On the basis of the collective entry data, the respective supplementary contribution amounts for those players are then summed to define the portion of the supplementary prize pool for allocation. In some embodiments the prize pool is monetary, whilst in some embodiments it includes either or both of monetary and non-monetary prizes having a total designated value corresponding to the value of the portion of the supplementary prize pool for allocation.

Step 1004 includes allocating to each player identified at step 1002 one or more supplementary entries in a supplementary gaming activity, which, in the present example, is a pari-mutuel gaming activity. The number of supplementary entries allocated to a given player is, in some embodiments, related to that player's supplementary contribution amount. In particular, the greater the supplementary contribution amount for a given player, the more supplementary entries awarded to that player. As such, players who make a comparatively greater supplementary contribution amount (for example by providing a larger entry fee or participating in additional marketing related activities) have a comparatively greater relative probability of winning a supplementary prize.

Step 1005 includes identifying one or more winning entries for the supplementary gaming activity. The nature of step 1005 depends to a greater extent on the nature of the supplementary gaming activity. For example, the supplementary gaming activity might be a sweepstakes, a raffle, a lottery, or another draw based game. In some cases there is a single winning entry, in other cases there are multiple winning entries. Where there are multiple winning entries, these may be ranked so as to receive different levels/categories/values of supplementary prize.

Step 1006 includes, on the basis of a predetermined distribution protocol, determining the portions of the supplementary prize pool identified at step 1003 for allocation to each player to whom winning supplementary entries were identified at step 1005.

Step 1007, in this case, includes allocating, to each winning player, a primary prize (based on the player's entry fee and the payout ratio for the selected event outcome) and, for players who selected event outcomes that were scratched and subsequently received winning supplementary entries, a supplementary prize as determined at step 1006. In the present embodiment, all players who selected event outcomes that were scratched also receive a refund of their respective entry fees.

It will be appreciated that such approaches provide a potential upside to selecting an event outcome that is ultimately scratched. It will further be appreciated that such embodiments may entice speculation on event outcomes well in advance of those outcomes being identified.

Hardware/Software Implementation

Although much of the above disclosure is predominately focussed on embodiments taking the form of methods, it will be appreciated that various embodiments of the present invention are technically implemented using various combinations of hardware and software. Some of these are considered below.

Figure 11A:
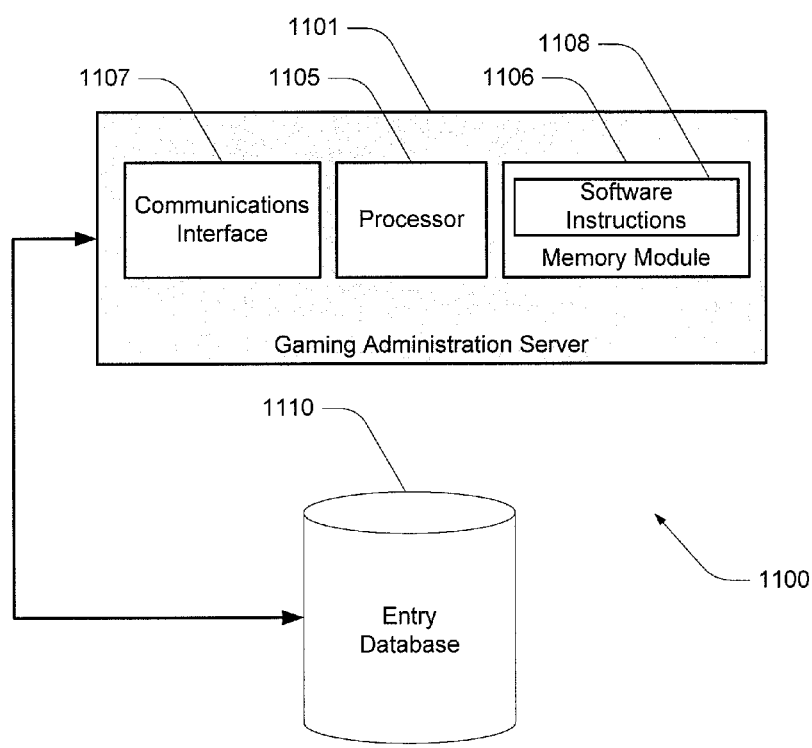
FIG. 11A illustrates system for providing a gaming activity according to one embodiment.

FIG. 11A illustrates a system for providing a gaming activity, in the form of system 1100. System 1100 includes a gaming administration server 1101. This gaming administration server includes a processor 1105 coupled to a memory module 1106 and a communications interface 1107.

Memory module 1106 is configured for maintaining software instructions 1106 which, when executed on processor 1105, allow server 1101 to perform various methods, including but not limited to one or more of the methods described herein.

The term "communications interface" or "interface" should be read broadly to include any component or group of components including one or more of a network interface (such as an Ethernet interface, or other wired/wireless network interface), modem, other interfaces configured to allow communication between server 1101 and another processing platform, ports (such as serial or parallel ports) for receiving data from or providing data to input/output devices such as keyboards, scanners and printers.

As illustrated, server 1101 is coupled to an entry database 1110. Although, in the context of the present illustrations, this database is shown as being a single discrete component, in alternate embodiments it is defined by a plurality of distributed components, optionally including memory modules of one or more servers such as server 1101.

Figure 11B:
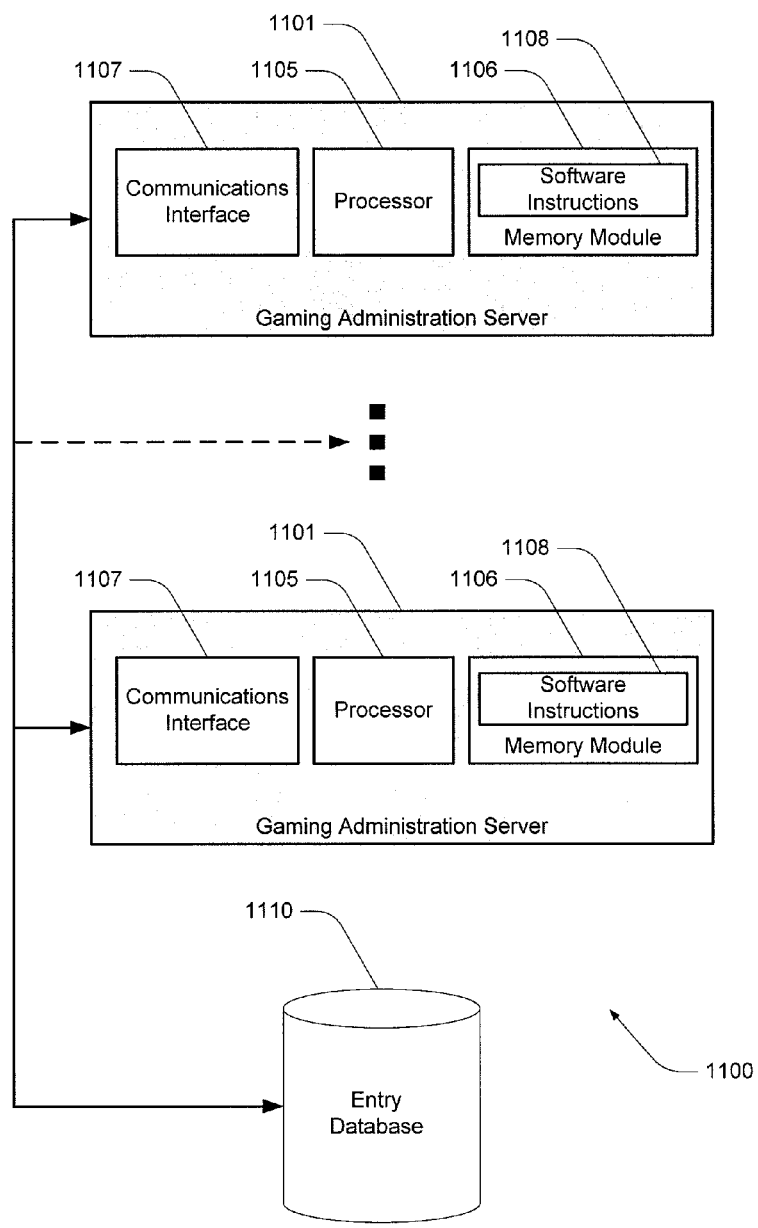
FIG. 11B illustrates a system for providing a gaming activity according to one embodiment.

In some embodiments, such as that of FIG. 11B, a plurality of like or similar servers 1101 are coupled to a common database 1110. For example, servers 1101 are provided at distributed locations, with a database 1110 provided at a centralised location.

Database 1110 maintains collective data indicative of entry transactions, which includes, in various embodiments, one or more of the following aspects of data:

Data indicative of a received entry fee. This includes data indicative of the value of entry fee, and optionally data indicative of a location at which funds corresponding to that entry fee are stored (for example, a bank account), and/or data indicative of a manner of payment used to provide the entry fee.

Data indicative of a selected event outcome corresponding to the entry fee.

Data indicative of one or more events corresponding to the selected event outcome.

Data indicative of supplementary contribution amounts (or anticipated supplementary contribution amounts).

Data indicative of a player who provided the entry fee. In some embodiments, a player is assigned an identifier which is used by that player for gaming related transactions. For example, in one embodiment this identifier is carried by a loyalty card, for example in the form of a barcode or RFID tag.

Data indicative of one or more entries allocated to the player in exchange for the entry fee. In some embodiments each entry is provided with a unique entry identifier (which is optionally used for winning entry determinations in the context of a lottery or raffle type game). In some embodiments the one or more entries allocated to a player in respect of a given entry fee are provided a common identifier—for example, the player is provided a single "ticket", which may be virtual or physical, carrying a ticket identifier. Entry identifiers and/or ticket identifiers are later used by the relevant players to allow the redemption of prizes and/or refunds, as discussed further below.

Data indicative of a particular gaming activity to which the entry fee and/or allocated entries relate.

Various aspects of this data are received via interface 1107 and/or defined by server 1101 (for instance, in response to data received via interface 1107). In some embodiments the allocation of entries occurs at server 1101, whilst in other embodiments the allocation of entries occurs at a remote location, for example a retailer terminal at a location where entries are sold to players.

Figure 11C:
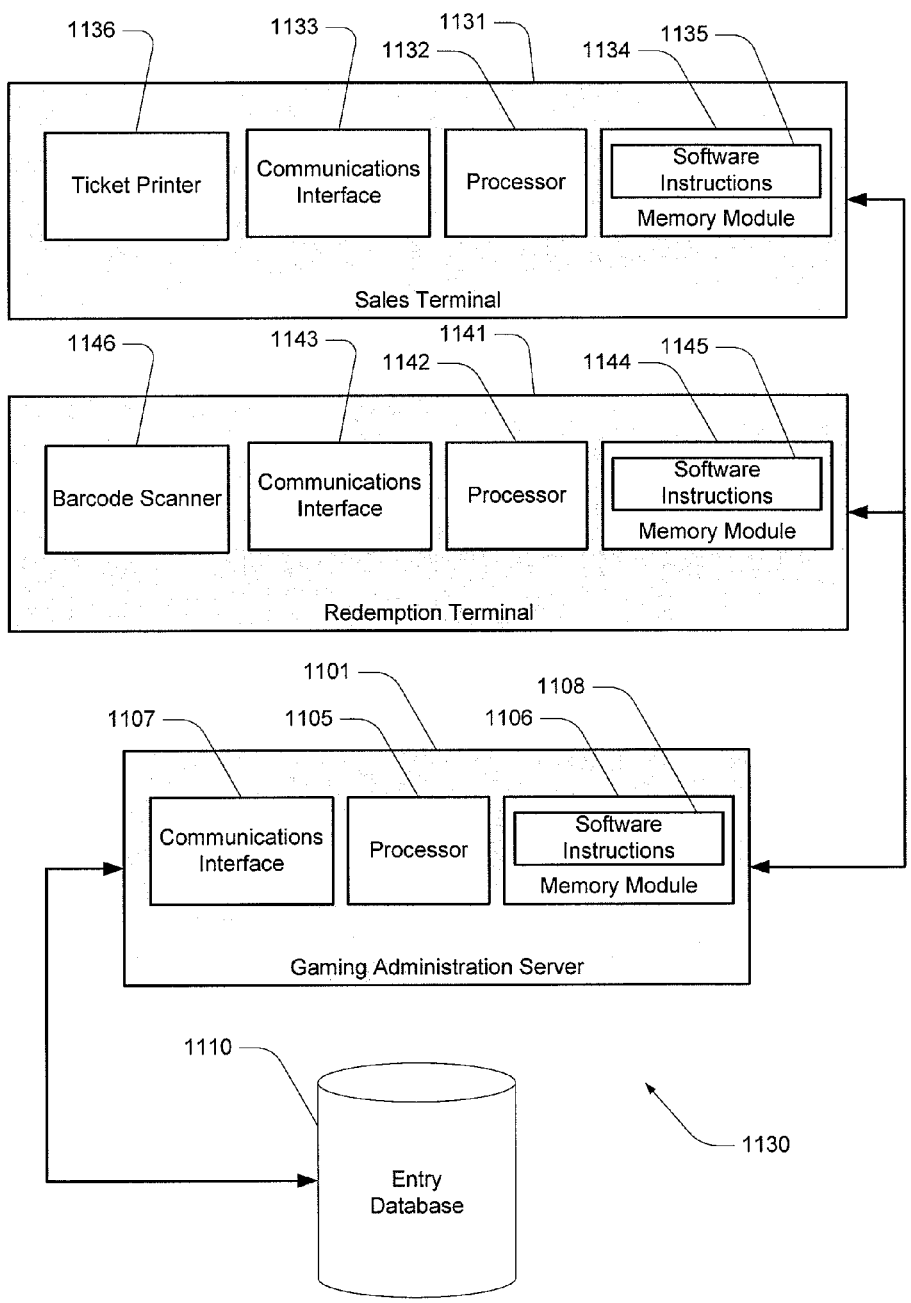
FIG. 11C illustrates a system for providing a gaming activity according to one embodiment.

FIG. 11C illustrates an embodiment where a server 1101 is coupled to a sales terminal 1131 and redemption terminal 1141. In some embodiments these are integrated into a single terminal.

As illustrated, terminal 1131 includes a processor 1132, communications interface 1133 and memory module 1134 (which maintains software instructions 1135). A ticket printer 1136 is also coupled to processor 1132.

In overview, a player interacts with terminal 1132 to purchase one or more entries in relation to a gaming activity. In some embodiments this is a direct interaction, whereas in other embodiments it is an indirect interaction whereby a terminal operator interacts with terminal 1132 on behalf of the player. The player provides information regarding the gaming activity in which entries are to be purchased, and the like. The player also provides an entry fee, optionally in the form of cash or electronic/card payment means. The entry fee is directly or indirectly transferred to an account stipulated by the gaming operator either immediately or at the end of a specified period (daily, for instance). Once the entry fee has been provided, the player is allocated one or more primary entries and, where relevant, one or more supplementary entries. The allocation of entries is, in some cases, based on a process performed at terminal 1131 and, in other cases, based on a process performed at terminal 1101 based on data provided by terminal 1131. In the present example, data indicative of the entries is printed to a ticket (which might include a receipt) via printer 1136. In some embodiments this ticket carries a ticket identifier and/or one or more entry identifiers corresponding to the allocated entries. In the present example, this information is derivable from a barcode (such as a 2-dimensional or 3-dimensional barcode) printed on the ticket.

As illustrated, terminal 1141 includes a processor 1142, communications interface 1143 and memory module 1144 (which maintains software instructions 1145). A barcode scanner 1146 is also coupled to processor 1142. In overview, to redeem one or more entries, a player presents a ticket carrying a barcode from which the relevant identifier (or identifiers) is derivable to scanner 1146. Scanner 1146 then performs a query process to determine whether the read barcode is indicative of any winning entries. This, in some cases, requires communications with server 1101. Prizes and/or refunds are provided to the player where appropriate. In some cases these are provided by cash, and in some cases by way of a further ticket that is redeemable for cask or cheque. In further cases, the player nominates a location to which the prize/refund should be delivered, such as a physical address or bank account. In some cases the player arranges for the prize/refund to be credited to a specified bank/credit card account.

In some embodiments, redemption is automated. For example, a player is invited to create a user account, this account including details of a bank account to which prizes/refunds are to be credited, and this crediting occurs automatically.

In some embodiments some or all of the general functionalities of either or both of terminal 1131 and 1141 are made available to a player via a personal computing platform, such as a desktop computer, laptop computer, cellular telephone, PDA, gaming console, or other platform. In some such embodiments, players access a website over the Internet to purchase entries, for example by selecting event outcomes via a selection interface provided by a web-page viewable through a web-browser application, and providing entry fees by way of an online payment procedure. In other embodiments, players download proprietary software as an alterative to a browser-based approach.

In some embodiments, entries are sold both via online approaches (for example via a website accessible over the Internet) and in-store approaches (for example at a retail locations having a sales terminal and/or redemption terminal). In some cases, different rules apply for entries sold online as opposed to entries sold in-store. For example, in one embodiment, in-store entries are sold on the basis of a first minimum spend level, whist online entries are sold on the basis of a second minimum spend level which is lower than the first level. In some cases in-store entries can only be purchased in exchange for entry fees that are integral multiples of the minimum spend level or another predefined value, although such restrictions do not apply online.

Figure 12A:
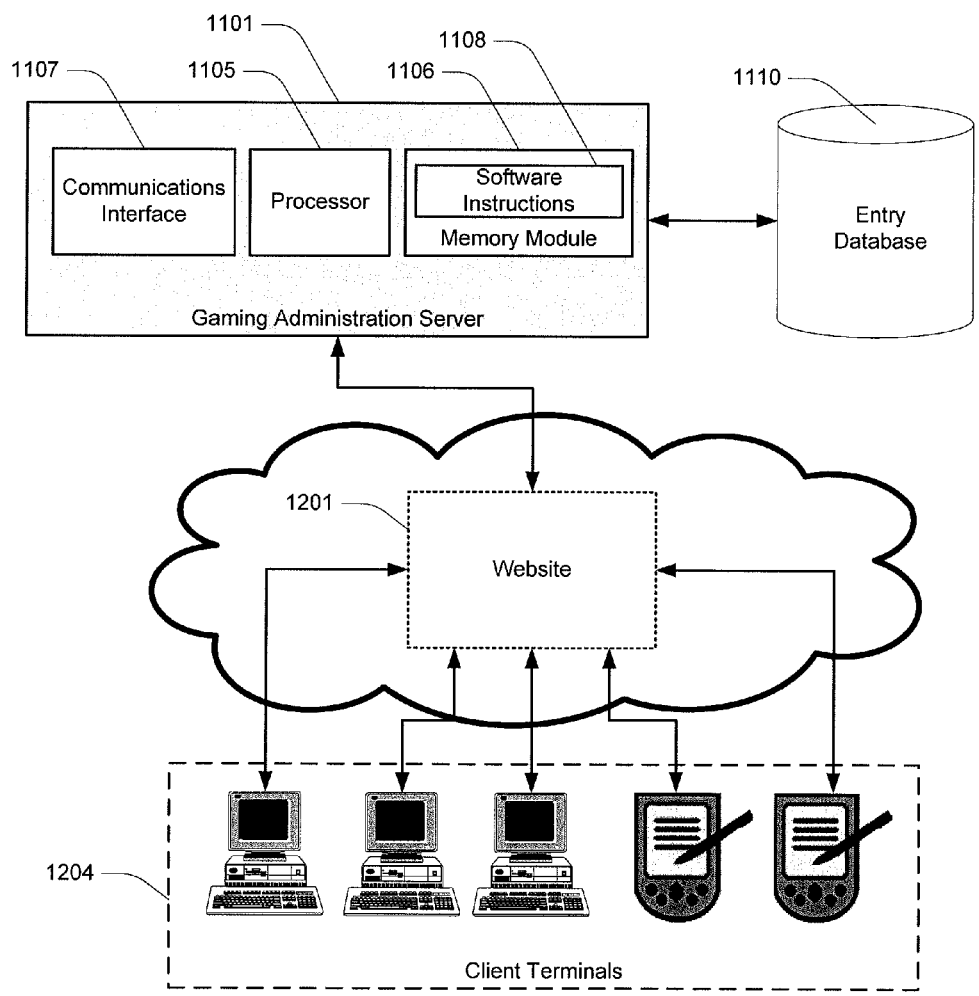
FIG. 12A illustrates system for providing a gaming activity according to one embodiment.
Figure 12B:
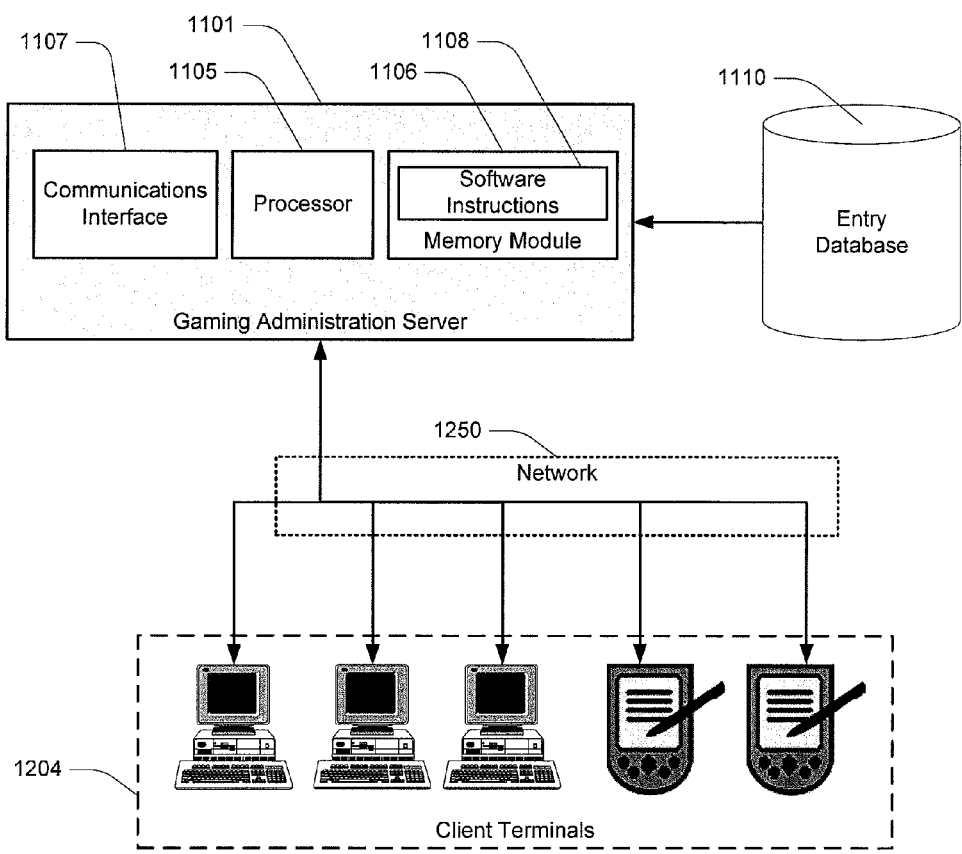
FIG. 12B illustrates a system for providing a gaming activity according to one embodiment.

FIG. 12A and FIG. 12B illustrate two approaches for interfacing gaming administration server 1101 with a plurality of client terminals 1204 (optionally including the likes of player's personal terminals, and terminals provided at entry retail venues). In some embodiments a combination of the two approaches are used.

The approach of FIG. 12A is to provide a website 1201 on the Internet for interfacing the client terminals with the administration server. The approach of FIG. 12B is to provide a connection, such as a VPN connection, over the Internet or another network (such as a LAN or WAN) 1250 for interfacing the client terminals with the administration server.

Unless specifically stated otherwise, as apparent from the following discussions, it is appreciated that throughout the specification discussions utilizing terms such as "processing," "computing," "calculating," "determining", analyzing" or the like, in some embodiments refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in some embodiments, performable by one or more processors that accept computer-readable (also called machine-readable) code containing a set of instructions that, when executed by one or more of the processors, carry out at least one of the methods described herein, or a variation on at least one of the methods described herein. Any processor capable of executing a set of instructions (sequential or otherwise) that specify actions to be taken should be included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of each of the methods described herein is in the form of a computer-readable carrier medium carrying a set of instructions (such as a computer program) that are for execution on one or more processors, (such as one or more processors that are part of an information system). Thus, as will be appreciated by those skilled in the art, embodiments of the present invention may be embodied as a method, an apparatus such as a special purpose apparatus, an apparatus such as a data processing system, or a computer-readable carrier medium (such as a computer program product). The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (such as a computer program product on a computer-readable storage medium) carrying computer-readable program code embodied in the medium.

The software may further be transmitted or received over a network via a network interface device or other communications interface. While the carrier medium is shown in an exemplary embodiment to be a single medium, the term "carrier medium" should be taken to include a single medium or multiple media (such as a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing system (such as a computer) executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Comments on Local Laws

It is appreciated that various embodiments described herein include or refer to practices or subject matter that may be considered as being contrary to local laws in various jurisdictions. To the extent that the claims below cover subject matter that is contrary to the local laws of a particular jurisdiction, the claims should be interpreted in that jurisdiction in a manner so as to exclude any practices or subject matter that is indeed contrary to those local laws. A particular example presently considered is Sharia law, which adopts a contrary stance to various aspects of gaming and investment as described herein. However, those skilled in the art will recognize how certain embodiments are implemented in accordance with Sharia law.

CONCLUSIONS

It will be appreciated that the above disclosure provides various systems and methods for conducting gaming activities, these generally providing useful alternatives or improvements in relation to known fixed-odds type gaming activities, Although the invention has been described with reference to specific examples, it will be appreciated by those skilled in the art that the invention may be embodied in many other forms. While there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added to or deleted from methods described herein whilst remaining within the scope of the present invention.

The invention claimed is:

1. A processor-implemented method for providing a gaming activity wherein a plurality of players provide respective entry fees, wherein one or more processors are configured to perform:

defining, for one or more event outcomes, respective payout ratios;

the one or more processors receiving, for each player, entry data indicative of an entry fee provided by the player and an event outcome selected by the player;

the one or more processors adding, for each player, at least a portion of the received entry data to a repository of collective entry data;

the one or more processors allocating to each player, on the basis of a primary portion of the entry fee provided by that player and the event outcome selected by that player, one or more primary entries in relation to a primary gaming activity whereby, in the case that for a given player the event outcome selected by the player is identified as a winning outcome, that player is awarded a primary prize based on the primary portion of the entry fee provided by the player and the payout ratio defined for the event outcome selected by the player; and the one or more processors allocating to each player, on the basis of an auxiliary portion of the entry fee provided by that player, an auxiliary entry having a different event outcome, wherein the different outcome of the auxiliary entry is defined such that the auxiliary entry will be a winning entry if the selected event outcome of the primary entry is not identified as the winning outcome, whereby in the case that the selected event outcome of the primary entry is not identified as a winning outcome, the auxiliary entry must be identified as a winning entry; and wherein the auxiliary portion of the entry fee provided by the player is fully refunded in the case that the auxiliary entry is not a winning entry, and wherein in the case that the auxiliary entry is a winning entry the player wins a supplementary prize having a value greater than the value of the auxiliary portion of the entry fee, such that the player's maximum potential loss is less than the value of the primary portion of the entry fee.

2. A method of gaming according to claim 1 wherein the proportion of the entry fee attributable to the auxiliary entry that is refundable is predetermined.

3. A processor-implemented method for providing a gaming activity wherein a plurality of players provide respective entry fees, wherein one or more processors are configured to perform:

defining, for one or more event outcomes, respective payout ratios;

the one or more processors receiving, for each player, entry data indicative of an entry fee provided by the player and an event outcome selected by the player;

the one or more processors adding, for each player, at least a portion of the received entry data to a repository of collective entry data;

the one or more processors allocating to each player, on the basis of the entry fee provided by that player and the event outcome selected by that player, one or more primary entries in relation to a primary gaming activity whereby, in the case that for a given player the event outcome selected by the player is identified as a winning outcome, that player is awarded a primary prize based on the entry fee provided by the player and the payout ratio defined for the event outcome selected by the player; and wherein a primary entry is allocated to a given player in exchange for a primary portion of the entry fee that is placed at risk, and an auxiliary entry is allocated to the player in exchange for an auxiliary portion of the entry fee that is fully refunded in the case that the auxiliary entry is not a winning entry, wherein in the case that the selected event outcome of the primary entry is not identified as a winning outcome, the auxiliary entry must be identified as a winning entry, wherein in the case that the auxiliary entry is a winning entry the player receives a prize having a value greater than the auxiliary entry fee, such that the player receives either:

(i) a prize corresponding to the primary entry plus a full refund of the auxiliary entry; or (ii) a prize having a value greater than the auxiliary entry fee;

such that the player's maximum potential loss is less than the value of the primary portion of the entry fee.

4. A method according to claim 3 wherein: in the case that the auxiliary entry is identified as a winning entry, the player is awarded an auxiliary prize; in the case that the auxiliary entry is not identified as a winning entry, the player is awarded a refund of the complementary proportion of the entry fee.

5. A method according to claim 4 wherein the auxiliary prize at least notionally includes the complementary proportion of the entry fee.

6. A method according to claim 4 wherein the auxiliary prize at least notionally includes a net investment return derived by subjecting at least part of the entry fee to an investment procedure.

7. A method according to claim 4 wherein the auxiliary prize is distributed from an auxiliary prize pool that is funded by a net investment return derived by subjecting the total entry fees of all players to an investment procedure.

8. A method of gaming according to claim 3 wherein the payout ratio is fixed at the time at which each entry is received.

9. A method of gaming according to claim 3 wherein the supplementary prize is allocated at the time of receiving the associated entry data.

10. A method of gaming according to claim 3 wherein the supplementary prize is allocated at the time of redeeming the primary prize.

11. A method of gaming according to claim 3 wherein the supplementary prize is allocated at a predetermined time.

12. A method according to claim 11 wherein the predetermined time is after a time at which one or more winning primary entries are identified.

* * * * *